US008372232B2

(12) United States Patent
Kronzer

(10) Patent No.: US 8,372,232 B2

(45) Date of Patent: Feb. 12, 2013

(54) HEAT TRANSFER MATERIALS AND METHOD OF USE THEREOF

(75) Inventor: Francis Joseph Kronzer, Woodstock, GA (US)

(73) Assignee: Neenah Paper, Inc., Alpharetta, GA (US)

( * ) Notice: Subject to any disclaimer, the term of this patent is extended or adjusted under 35 U.S.C. 154(b) by 1151 days.

(21) Appl. No.: 10/894,841

(22) Filed: Jul. 20, 2004

(65) Prior Publication Data

US 2006/0019043 A1 Jan. 26, 2006

(51) Int. Cl.

| | |
|---|---|
| ***B44C 1/17*** | (2006.01) |
| ***B44C 1/24*** | (2006.01) |
| ***B44C 1/16*** | (2006.01) |
| ***B32B 37/12*** | (2006.01) |
| ***B32B 37/14*** | (2006.01) |
| ***B32B 38/10*** | (2006.01) |
| ***B32B 38/14*** | (2006.01) |
| *B32B 37/04* | (2006.01) |

(52) U.S. Cl. ......... 156/235; 156/230; 156/239; 156/240

(58) Field of Classification Search .................. 156/230, 156/235, 239, 240; 428/32.51

See application file for complete search history.

(56) References Cited

U.S. PATENT DOCUMENTS

| | | | |
|---|---|---|---|
| 1,858,673 | A | 5/1932 | Lawrence |
| 3,359,127 | A | 12/1967 | Meyer et al. |
| 3,616,176 | A | 10/1971 | Jackimowicz |
| 3,790,439 | A | 2/1974 | LaPerre et al. |
| 3,872,040 | A | 3/1975 | Mollohan et al. |
| 3,922,435 | A | 11/1975 | Asnes |
| 4,021,591 | A | 5/1977 | DeVries et al. |
| 4,107,365 | A | 8/1978 | Reed et al. |
| 4,167,414 | A | 9/1979 | Morgan |
| 4,224,358 | A | 9/1980 | Hare |
| 4,235,657 | A | 11/1980 | Greenman et al. |

(Continued)

FOREIGN PATENT DOCUMENTS

| | | | |
|---|---|---|---|
| DE | 2842139 | A1 | 4/1979 |
| EP | 0241212 | A2 | 10/1987 |

(Continued)

OTHER PUBLICATIONS

Search Report and Written Opinion for PCT/US2005/010495, Apr. 18, 2006.

(Continued)

*Primary Examiner* — Sonya Mazumdar

(74) *Attorney, Agent, or Firm* — Dority & Manning, P.A.

(57) ABSTRACT

A heat transfer material kit is disclosed that includes a first image transfer material that includes a printable non-porous surface, and a second image transfer material that includes an outer layer having a film forming binder and thermoplastic particles. A method of using the kit is disclosed that includes the steps of a) imaging the substantially non-porous printable surface to form an imaged surface having printed and un-printed areas; b) positioning the outer layer adjacent the imaged surface; c) transferring a portion of the outer layer to the printed area while transferring a lesser portion of the outer layer to the non-printed area to form a coated imaged surface having a non-printed area with less coating than the printed area; and d) thereafter transferring the coated image to a substrate. Alternate methods of using the kit and applying images to substrates that provide good image appearance and durability are also disclosed.

29 Claims, 2 Drawing Sheets

U.S. PATENT DOCUMENTS

| | | | | |
|---|---|---|---|---|
| 4,240,807 | A | 12/1980 | Kronzer | |
| 4,303,717 | A | 12/1981 | Andrews | |
| 4,322,467 | A | 3/1982 | Heimbach et al. | |
| 4,351,871 | A | 9/1982 | Lewis et al. | |
| 4,383,878 | A | 5/1983 | Young et al. | |
| 4,399,209 | A | 8/1983 | Sanders et al. | |
| 4,496,618 | A | 1/1985 | Pernicano | |
| 4,517,237 | A | 5/1985 | Pernicano | |
| 4,536,434 | A | 8/1985 | Magnotta | |
| 4,548,857 | A | 10/1985 | Galante | |
| 4,664,735 | A | 5/1987 | Pernicano | |
| 4,757,047 | A | 7/1988 | Kosaka | |
| 4,758,952 | A | 7/1988 | Harris, Jr. et al. | |
| 4,773,953 | A | 9/1988 | Hare | |
| 4,775,657 | A | 10/1988 | Harrison et al. | |
| 4,786,349 | A | 11/1988 | Mahn, Sr. | |
| 4,863,781 | A | 9/1989 | Kronzer | |
| 4,929,501 | A | 5/1990 | Okada et al. | |
| 4,966,815 | A | 10/1990 | Hare | |
| 4,980,224 | A | 12/1990 | Hare | |
| 5,006,502 | A | 4/1991 | Fujimura et al. | |
| 5,019,475 | A | 5/1991 | Higashiyama et al. | |
| 5,028,028 | A | 7/1991 | Yamada et al. | |
| 5,053,267 | A | 10/1991 | Ide et al. | |
| 5,059,580 | A | 10/1991 | Shibata et al. | |
| 5,064,743 | A | 11/1991 | Koshizuka et al. | |
| 5,087,527 | A | 2/1992 | Shimura et al. | |
| 5,110,389 | A | 5/1992 | Hiyoshi et al. | |
| 5,132,277 | A | 7/1992 | Kaszczuk et al. | |
| 5,139,917 | A | 8/1992 | Hare | |
| 5,141,915 | A | 8/1992 | Roenigk et al. | |
| 5,147,489 | A | 9/1992 | Scrutton et al. | |
| 5,151,326 | A | 9/1992 | Matsuda et al. | |
| 5,236,801 | A | 8/1993 | Hare | |
| 5,242,739 | A | 9/1993 | Kronzer et al. | |
| 5,248,543 | A | 9/1993 | Yamaguchi et al. | |
| 5,252,531 | A | 10/1993 | Yasuda et al. | |
| 5,252,533 | A | 10/1993 | Yasuda et al. | |
| 5,263,781 | A | 11/1993 | Mima et al. | |
| 5,264,279 | A | 11/1993 | Imamura et al. | |
| 5,271,990 | A | 12/1993 | Kronzer et al. | |
| 5,286,521 | A | 2/1994 | Matsuda et al. | |
| 5,310,589 | A | 5/1994 | Nagashima | |
| 5,318,943 | A | 6/1994 | Ueno et al. | |
| 5,332,713 | A | 7/1994 | Oldfield et al. | |
| 5,334,439 | A | 8/1994 | Kawaguchi et al. | |
| 5,338,603 | A | 8/1994 | Mahn, Sr. et al. | |
| 5,342,739 | A | 8/1994 | Katou et al. | |
| 5,356,853 | A | 10/1994 | Ueno et al. | |
| 5,362,703 | A | 11/1994 | Kawaski et al. | |
| 5,366,251 | A | 11/1994 | Brandt et al. | |
| 5,372,987 | A | 12/1994 | Fisch et al. | |
| 5,372,988 | A | 12/1994 | Takeuchi et al. | |
| 5,387,574 | A | 2/1995 | Campbell et al. | |
| 5,407,724 | A | 4/1995 | Mimura et al. | |
| 5,413,841 | A | 5/1995 | Mahn, Sr. et al. | |
| 5,419,944 | A | 5/1995 | Sammis | |
| 5,427,997 | A | 6/1995 | Oshima et al. | |
| 5,431,501 | A | 7/1995 | Hale et al. | |
| 5,432,258 | A | 7/1995 | Yoshirmura | |
| 5,444,037 | A | 8/1995 | Imai et al. | |
| 5,484,644 | A | 1/1996 | Imamura et al. | |
| 5,501,902 | A | 3/1996 | Kronzer | |
| 5,508,105 | A | 4/1996 | Orensteen et al. | |
| 5,520,763 | A * | 5/1996 | Johnstone | 156/234 |
| 5,571,766 | A | 11/1996 | Imai et al. | |
| 5,614,345 | A | 3/1997 | Gumbiowski et al. | |
| 5,616,155 | A | 4/1997 | Kronzer | |
| 5,647,935 | A | 7/1997 | Hoshino et al. | |
| 5,654,080 | A | 8/1997 | Hayashi et al. | |
| 5,660,928 | A | 8/1997 | Stokes et al. | |
| 5,670,448 | A | 9/1997 | Kometani | |
| 5,677,049 | A | 10/1997 | Torii | |
| 5,707,925 | A | 1/1998 | Akada et al. | |
| 5,716,477 | A | 2/1998 | Yamaguchi et al. | |
| 5,716,900 | A | 2/1998 | Kronzer et al. | |
| 5,770,268 | A | 6/1998 | Kuo et al. | |
| 5,776,854 | A | 7/1998 | Hayashi | |
| 5,789,134 | A | 8/1998 | Brault et al. | |
| 5,798,161 | A | 8/1998 | Kita et al. | |
| 5,798,179 | A | 8/1998 | Kronzer | |
| 5,846,367 | A | 12/1998 | Omote et al. | |
| 5,861,355 | A | 1/1999 | Olson et al. | |
| 5,876,836 | A | 3/1999 | Imamura et al. | |
| 5,879,813 | A | 3/1999 | Tanaka et al. | |
| 5,880,065 | A | 3/1999 | Hayashi et al. | |
| 5,885,928 | A | 3/1999 | Hirano et al. | |
| 5,891,824 | A | 4/1999 | Simpson et al. | |
| 5,895,557 | A | 4/1999 | Kronzer | |
| 5,897,735 | A | 4/1999 | Peskin | |
| 5,898,018 | A | 4/1999 | Hirano et al. | |
| 5,925,712 | A | 7/1999 | Kronzer | |
| 5,942,335 | A | 8/1999 | Chen et al. | |
| 5,945,375 | A | 8/1999 | Kronzer | |
| 5,948,586 | A | 9/1999 | Hare | |
| 5,962,149 | A | 10/1999 | Kronzer | |
| 5,981,045 | A | 11/1999 | Kuwabara et al. | |
| 5,981,077 | A | 11/1999 | Taniguchi | |
| 6,004,419 | A * | 12/1999 | Torii | 156/234 |
| 6,017,636 | A | 1/2000 | Tada et al. | |
| 6,020,397 | A | 2/2000 | Matzinger | |
| 6,033,739 | A | 3/2000 | Kronzer | |
| 6,043,194 | A | 3/2000 | Saito et al. | |
| 6,054,223 | A | 4/2000 | Tsuchiya et al. | |
| 6,066,387 | A | 5/2000 | Ueda et al. | |
| 6,071,368 | A | 6/2000 | Boyd et al. | |
| 6,083,656 | A | 7/2000 | Hare et al. | |
| 6,083,872 | A | 7/2000 | Adkins | |
| 6,087,061 | A | 7/2000 | Hare et al. | |
| 6,096,475 | A | 8/2000 | Hare et al. | |
| 6,103,364 | A | 8/2000 | Harris et al. | |
| 6,113,725 | A | 9/2000 | Kronzer | |
| 6,139,672 | A | 10/2000 | Sato et al. | |
| 6,177,187 | B1 | 1/2001 | Niemoller et al. | |
| 6,180,219 | B1 | 1/2001 | Hoshino et al. | |
| 6,200,668 | B1 | 3/2001 | Kronzer | |
| 6,207,268 | B1 * | 3/2001 | Kosaka et al. | 428/325 |
| 6,210,794 | B1 | 4/2001 | Nakamura | |
| 6,214,149 | B1 | 4/2001 | Nakano et al. | |
| 6,232,267 | B1 | 5/2001 | Oshima et al. | |
| 6,232,268 | B1 | 5/2001 | Narita et al. | |
| 6,245,710 | B1 | 6/2001 | Hare et al. | |
| 6,251,824 | B1 | 6/2001 | Ueno et al. | |
| 6,265,053 | B1 | 7/2001 | Kronzer et al. | |
| 6,277,229 | B1 | 8/2001 | Popat et al. | |
| 6,281,166 | B1 | 8/2001 | Kronzer | |
| 6,290,798 | B1 | 9/2001 | Onishi et al. | |
| 6,291,062 | B1 * | 9/2001 | Oshima et al. | 428/323 |
| 6,294,307 | B1 | 9/2001 | Hare et al. | |
| 6,309,495 | B1 | 10/2001 | Lakes | |
| 6,316,385 | B1 * | 11/2001 | Usuki et al. | 503/227 |
| 6,335,307 | B1 | 1/2002 | Imai et al. | |
| 6,346,313 | B1 | 2/2002 | Cook | |
| 6,350,508 | B1 | 2/2002 | Ueno et al. | |
| 6,358,600 | B1 | 3/2002 | Hayashi et al. | |
| 6,358,660 | B1 | 3/2002 | Agler et al. | |
| 6,383,710 | B2 | 5/2002 | Hare et al. | |
| 6,395,375 | B1 | 5/2002 | Imamura et al. | |
| 6,410,200 | B1 | 6/2002 | Williams et al. | |
| 6,423,466 | B2 | 7/2002 | Hare et al. | |
| 6,428,878 | B1 | 8/2002 | Kronzer | |
| 6,432,549 | B1 | 8/2002 | Kronzer | |
| 6,450,633 | B1 | 9/2002 | Kronzer | |
| 6,465,393 | B1 | 10/2002 | Nakano et al. | |
| 6,482,285 | B2 | 11/2002 | Cross | |
| 6,497,781 | B1 | 12/2002 | Dalvey et al. | |
| 6,509,131 | B2 | 1/2003 | Hare et al. | |
| 6,531,216 | B1 | 3/2003 | Williams et al. | |
| 6,551,692 | B1 | 4/2003 | Dalvey et al. | |
| 6,582,803 | B2 | 6/2003 | Cole et al. | |
| 6,593,406 | B2 | 7/2003 | Sargeant et al. | |
| 6,613,412 | B1 | 9/2003 | Dressler | |
| 6,638,682 | B2 * | 10/2003 | Hare et al. | 430/256 |
| 7,361,247 | B2 * | 4/2008 | Kronzer | 156/230 |
| 7,887,667 | B2 * | 2/2011 | Dolsey | 156/254 |
| 8,157,944 | B2 * | 4/2012 | Kronzer | 156/234 |
| 8,236,123 | B2 * | 8/2012 | Dolsey | 156/235 |

| | | | | | |
|---|---|---|---|---|---|
| 2002/0000286 | A1* | 1/2002 | Onishi et al. | .................. | 156/234 |
| 2002/0048663 | A1* | 4/2002 | Ueno et al. | .................... | 428/195 |
| 2002/0081420 | A1 | 6/2002 | Kronzer | | |
| 2002/0102391 | A1 | 8/2002 | Kronzer | | |
| 2002/0146544 | A1 | 10/2002 | Kronzer | | |
| 2002/0153110 | A1 | 10/2002 | Yamaguchi et al. | | |
| 2003/0008116 | A1 | 1/2003 | Williams et al. | | |
| 2003/0021962 | A1 | 1/2003 | Mukherjee et al. | | |
| 2004/0126576 | A1* | 7/2004 | Kinning et al. | ............... | 428/352 |

FOREIGN PATENT DOCUMENTS

| | | | |
|---|---|---|---|
| EP | 0241212 | A3 | 10/1987 |
| EP | 0266094 | A1 | 5/1988 |
| EP | 0466503 | A1 | 1/1992 |
| EP | 0659579 | A2 | 6/1995 |
| EP | 0652114 | B1 | 1/1998 |
| EP | 0842786 | A1 | 5/1998 |
| EP | 0933226 | A2 | 8/1999 |
| EP | 0850786 | B1 | 3/2002 |
| EP | 1219460 | A2 | 7/2002 |
| EP | 1232874 | A1 | 8/2002 |
| EP | 1020299 | B1 | 4/2003 |
| EP | 1316435 | A1 | 6/2003 |
| EP | 1340626 | A1 | 9/2003 |
| EP | 1344653 | A1 | 9/2003 |
| FR | 2442721 | A | 8/1980 |
| GB | 1487599 | | 10/1977 |
| GB | 2084931 | A | 4/1982 |
| GB | 2147614 | A | 5/1985 |
| GB | 2243332 | A | 10/1991 |
| JP | 01208192 | A | 8/1989 |
| JP | 03010879 | A | 1/1991 |
| JP | 6-155995 | A | 6/1994 |
| JP | 06312573 | A | 11/1994 |
| JP | 2002-079767 | A | 3/2002 |
| WO | WO 87/04393 | | 7/1987 |
| WO | WO 90/00473 | | 1/1990 |
| WO | WO 91/06433 | | 5/1991 |
| WO | WO 9114207 | A1 | 9/1991 |
| WO | WO 92/22857 | | 12/1992 |
| WO | WO 93/21561 | | 10/1993 |
| WO | WO 95/08419 | | 3/1995 |
| WO | WO 96/10491 | | 4/1996 |
| WO | WO 97/01448 | | 1/1997 |
| WO | WO 97/33763 | | 9/1997 |
| WO | WO 98/43821 | | 10/1998 |
| WO | WO 99/25917 | | 5/1999 |
| WO | WO 00/59733 | | 10/2000 |
| WO | WO 00/64685 | | 11/2000 |
| WO | WO 00/73570 | | 12/2000 |
| WO | WO 01/03941 | | 1/2001 |
| WO | WO 01/12448 | | 2/2001 |
| WO | WO 01/17792 | | 3/2001 |
| WO | WO 01/23664 | | 4/2001 |
| WO | WO 01/62514 | | 8/2001 |
| WO | WO 02/36353 | | 5/2002 |
| WO | WO 02/055311 | | 7/2002 |
| WO | WO 03/006736 | | 1/2003 |
| WO | WO 03066337 | A2 | 8/2003 |
| WO | WO 03066337 | A3 | 8/2003 |

OTHER PUBLICATIONS

Abstract of Japanese Patent No. 2001162932, Jun. 19, 2001.

Search Report and Written Opinion for PCT/US2004/039983, May 9, 2005.

ASTM Designation: E-28-99, "Standard Test Methods for Softening Point of Resins Derived from Naval Stores by Ring-and-Ball Apparatus", Dec. 1999, pp. 1-6.

ASTM Designation: D-1238-00, "Standard Test Method for Melt Flow Rates of Thermoplastics by Extrusion Plastometer", Nov. 2000, pp. 1-12.

* cited by examiner

HEAT TRANSFER MATERIALS AND METHOD OF USE THEREOF

BACKGROUND OF THE INVENTION

In recent years, a significant industry has developed which involves the application of customer-selected designs, messages, illustrations, and the like (referred to collectively hereinafter as "images") on articles of clothing, such as T-shirts, sweat shirts, and the like. These images may be commercially available products tailored for a specific end-use and printed on a release or transfer paper, or the customer may generate the images on a heat transfer paper. The images are transferred to the article of clothing by means of heat and pressure, after which the release or transfer paper is removed.

Heat transfer papers having an enhanced receptivity for images made by wax-based crayons, thermal printer ribbons, ink-jet printers, laser-jet printers, and impact ribbon or dot-matrix printers, are well known in the art. Typically, a heat transfer material includes a cellulosic base sheet and an image-receptive coating on a surface of the base sheet. The image-receptive coating usually contains one or more film-forming polymeric binders, as well as, other additives to improve the transferability and printability of the coating. Other heat transfer materials include a cellulosic base sheet and an image-receptive coating, wherein the image-receptive coating is formed by melt extrusion or by laminating a film to the base sheet. The surface of the coating or film may then be roughened by, for example, passing the coated base sheet through an embossing roll.

Much effort has been directed at generally improving the transferability of an image-bearing laminate (coating) to a substrate. For example, an improved cold-peelable heat transfer material has been described in U.S. Pat. No. 5,798,179, which allows removal of the base sheet immediately after transfer of the image-bearing laminate ("hot peelable heat transfer material") or some time thereafter when the laminate has cooled ("cold peelable heat transfer material"). Moreover, additional effort has been directed to improving the crack resistance and washability of the transferred laminate. The transferred laminate must be able to withstand multiple wash cycles and normal "wear and tear" without cracking or fading.

Various techniques have been used in an attempt to improve the overall quality of the transferred laminate and the article of clothing containing the same. For example, plasticizers and coating additives have been added to coatings of heat transfer materials to improve the crack resistance and washability of image-bearing laminates on articles of clothing.

Heat transfer papers generally are sold in standard printer paper sizes, for example, 8.5 inches by 11 inches. Graphic images are produced on the transferable surface or coating of the heat transfer paper by any of a variety of means, for example, by ink-jet printer, laser-jet printer, laser-color copier, other toner-based printers and copiers, and so forth. The image and the transferable surface are then transferred to a substrate such as, for example, a cotton T-shirt. In some circumstances it is desirable that the transferable surface only transfer in those areas where there is a graphic image, thus reducing the overall area of the substrate that is coated with the transferable coating. Some papers have been developed that are "weedable", that is, portions of the transferable coating can be removed from the heat transfer paper prior to the transfer to the substrate. Weeding involves cutting around the printed areas and removing the coating from the extraneous non-printed areas. However, such weeding processes can be difficult to perform, especially around intricate graphic designs. Therefore, there remains a need in the art for improved weedable heat transfer papers and methods of application. Desirably, the papers and methods provide good image appearance and durability.

SUMMARY OF THE INVENTION

In accordance with one embodiment of the present invention, a method of applying an image to a substrate is disclosed that includes the steps of:

a) imaging a printable surface of a first image transfer material to form an imaged surface having a printed area and a non-printed area on the first image transfer material;

b) providing a second image transfer material comprising an outer layer, the outer layer comprising a film forming binder and thermoplastic particles;

c) positioning the outer layer of the second image transfer material adjacent the imaged surface of the first image transfer material;

d) transferring a portion of the outer layer of the second image transfer material to the printed area of the imaged surface while transferring a lesser portion of the outer layer of the second image transfer material to the non-printed area to form a coated imaged surface having a non-printed area with less coating than the printed area; and e) thereafter, transferring the coated image to a substrate.

In accordance with another embodiment of the present invention, a method of applying an image to a substrate is disclosed that includes the steps of:

a) providing a first image transfer material including an outer layer, the outer layer including a film forming binder and thermoplastic particles, the outer layer further including a printable surface;

b) imaging the printable surface of the first heat transfer material to form an imaged surface having a printed area and a non-printed area on the first image transfer material;

c) providing a second image transfer material having a substantially non-porous surface;

d) positioning the imaged outer layer of the first image transfer material adjacent the substantially non-porous surface of the second image transfer material;

e) transferring the printed area and a first portion of the outer layer of the first image transfer material to the substantially non-porous surface of the second image transfer material to form a coated imaged surface on the second image transfer material having a non-printed area with less coating than the printed area; and f) thereafter, transferring the coated image to a substrate.

The imaging step may be performed by any type of printing device, but desirably is performed by laser-color copier, laser-jet printer, or other toner-based printers or copiers. The transferring steps may be performed through application of heat and pressure to the image transfer materials. The application of heat and pressure may be, for example, performed by hand ironing or by using a heat press. Desirably, the first transferring steps are performed at a temperature below the melting point of the thermoplastic particles. However, the second transferring steps are desirably performed at a temperature above the melting point of the thermoplastic particles and/or the film-forming binder.

In accordance with one embodiment of the present invention, an image transfer material kit is disclosed that includes a first image transfer material that includes a substantially non-porous printable surface, and a second image transfer material that includes an outer layer including a film forming binder and thermoplastic particles. The first and second image transfer materials may be labeled so as to allow a user to distinguish therebetween. The kit may contain substantially equal numbers of the first and second image transfer materials, or the kit may contain more of the second image transfer material than the first image transfer material.

In one aspect, the first image transfer material may further include a base layer, and a release layer overlaying the base layer. The release layer may include, for example, a polymer having essentially no tack at transfer temperatures of about 177 degrees Celsius and/or a crosslinked polymer. Desirably, the release layer may include a polymer selected from the group consisting of acrylic polymers, poly(vinyl acetate), and so forth. The release layer may include an effective amount of a release-enhancing additive in the release layer. The release-enhancing additive may include, for example, a divalent metal ion salt of a fatty acid, a polyethylene glycol, a silicone surfactant, a mixture thereof, and so forth. More specifically, the release-enhancing additive may include, for example, calcium stearate, a polyethylene glycol having a molecular weight of from about 2,000 to about 100,000, a siloxane-polyether surfactant, a mixture thereof, and so forth.

In a further aspect, the second image transfer material may further include a base layer, and a release layer overlaying the base layer-and underlying the outer layer. The release layer may include, for example, a polymer having essentially no tack at transfer temperatures of about 177 degrees Celsius and/or a crosslinked polymer. Desirably, the release layer may include a polymer selected from the group consisting of acrylic polymers, poly(vinyl acetate), and so forth. In one embodiment, the release layer and the outer layer are adapted to provide the second image transfer material with cold release properties. Such cold-release properties may be imparted by using an effective amount of a release-enhancing additive in the release layer as described above for the first heat transfer material.

In yet another aspect, a method of using the kit is disclosed that includes the steps of:

a) imaging the substantially non-porous printable surface of one of the first image transfer material to form an imaged surface having a printed area and a non-printed area on the first image transfer material;

b) positioning the outer layer of one of the second image transfer material adjacent the imaged surface;

c) transferring a portion of the outer layer to the printed area of the imaged surface while transferring a lesser portion of the outer layer to the non-printed area to form a coated imaged surface having a non-printed area with less coating than the printed area; and d) thereafter, transferring the coated image to a substrate.

In another aspect, a method of using the kit is disclosed that includes the steps of:

a) imaging the outer layer of the second image transfer material to form an imaged surface having a printed area and a non-printed area on the second image transfer material;

b) positioning the outer layer of the second image transfer material adjacent the substantially non-porous surface of the first image transfer material;

c) transferring the printed area and a first portion of the outer layer of the second image transfer material to the substantially non-porous surface of the first image transfer material to form a coated imaged surface on the first image transfer material having a non-printed area with less coating than the printed area; and d) thereafter, transferring the coated image to a substrate.

In accordance with one embodiment of the present invention, a heat transfer intermediate includes a base sheet having a non-porous surface, an image including meltable toners adhered to a printed area of the non-porous surface, and a heat activated polymer coating overlaying the meltable toners, wherein the basis weight of the polymer coating overlaying the meltable toners is greater than the basis weight of the polymer coating overlaying an unprinted area of the non-porous surface. In one aspect, the base sheet includes a backing layer, a conformable layer overlaying the backing layer, and a release coating overlaying the conformable layer.

In accordance with another embodiment of the present invention, a decorated article includes a substrate and a decoration imprinted on the substrate. The decoration includes first and second areas, the first area including meltable toners and the second area being devoid of meltable toners. The decoration further includes a heat activated polymer layer, wherein a portion of the heat activated polymer layer is positioned between the meltable toners and the substrate, and further wherein the basis weight of the heat activated polymer layer under the first area is greater than the basis weight of the heat activated polymer layer under the second area.

Other features and aspects of the present invention are discussed in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figures in which.

DETAILED DESCRIPTION OF REPRESENTATIVE EMBODIMENTS

Figure 1:
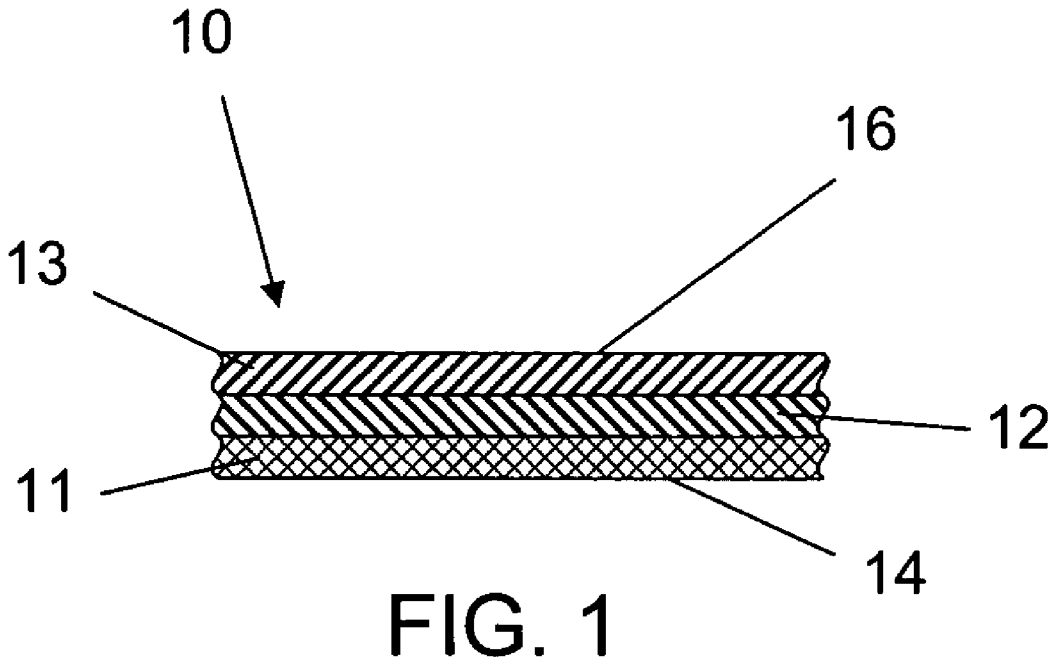
FIG. 1 is a fragmentary sectional view of a release sheet transfer material made in accordance with the present invention.

Reference will now be made in detail to embodiments of the invention, one or more examples of which are provided herein. Each example is provided by way of explanation of the invention and not meant as a limitation of the invention. For example, features illustrated or described as part of one embodiment may be utilized with another embodiment to yield still a further embodiment. It is intended that the present invention include such modifications and variations as come within the scope of the appended claims and their equivalents.

Definitions

As used herein, the term "printable" is meant to include enabling the placement of an image on a material by any means, such as by direct and offset gravure printers, silk-screening, typewriters, laser printers, laser copiers, other toner-based printers and copiers, dot-matrix printers, and ink jet printers, by way of illustration. Moreover, the image composition may be any of the inks or other compositions typically used in printing processes.

The term "molecular weight" generally refers to a weight-average molecular weight unless another meaning is clear from the context or the term does not refer to a polymer. It long has been understood and accepted that the unit for molecular weight is the atomic mass unit, sometimes referred to as the "dalton." Consequently, units rarely are given in current literature. In keeping with that practice, therefore, no units are expressed herein for molecular weights.

As used herein, the term "cellulosic nonwoven web" is meant to include any web or sheet-like material which contains at least about 50 percent by weight of cellulosic fibers. In addition to cellulosic fibers, the web may contain other natural fibers, synthetic fibers, or mixtures thereof. Cellulosic nonwoven webs may be prepared by air laying or wet laying relatively short fibers to form a web or sheet. Thus, the term includes nonwoven webs prepared from a papermaking furnish. Such furnish may include only cellulose fibers or a mixture of cellulose fibers with other natural fibers and/or synthetic fibers. The furnish also may contain additives and other materials, such as fillers, e.g., clay and titanium dioxide, surfactants, antifoaming agents, and the like, as is well known in the papermaking art.

As used herein, the term "polymer" generally includes, but is not limited to, homopolymers; copolymers, such as, for example, block, graft, random and alternating copolymers; and terpolymers; and blends and modifications thereof. Furthermore, unless otherwise specifically limited, the term "polymer" shall include all possible geometrical configurations of the material. These configurations include, but are not limited to isotactic, syndiotactic, and random symmetries.

The term "thermoplastic polymer" is used herein to mean any polymer which softens and flows when heated; such a polymer may be heated and softened a number of times without suffering any basic alteration in characteristics, provided heating is below the decomposition temperature of the polymer. Examples of thermoplastic polymers include, by way of illustration only, end-capped polyacetals, such as poly(oxymethylene) or polyformaldehyde, poly(trichloroacetaldehyde), poly(n-valeraldehyde), poly(acetaldehyde), and poly(propionaldehyde); acrylic polymers, such as polyacrylamide, poly(acrylic acid), poly(methacrylic acid), poly(ethyl acrylate), and poly(methyl methacrylate); fluorocarbon polymers, such as poly(tetrafluoroethylene), perfluorinated ethylene-propylene copolymers, ethylene-tetrafluoroethylene copolymers, poly(chlorotrifluoroethylene), ethylene-chlorotrifluoroethylene copolymers, poly(vinylidene fluoride), and poly(vinyl fluoride); polyamides, such as poly(6-aminocaproic acid) or poly(e-caprolactam), poly(hexamethylene adipamide), poly(hexamethylene sebacamide), and poly(11-aminoundecanoic acid); polyaramides, such as poly(imino-1,3-phenyleneiminoisophthaloyl) or poly(m-phenylene isophthalamide); parylenes, such as poly-p-xylylene and poly(chloro-p-xylylene); polyaryl ethers, such as poly(oxy-2,6-dimethyl-1,4-phenylene) or poly(p-phenylene oxide); polyaryl sulfones, such as poly(oxy-1,4-phenylenesulfonyl-1,4-phenyleneoxy-1,4-phenylene-isopropylidene-1,4-phenylene) and poly(sulfonyl-1,4-phenyleneoxy-1,4-phenylenesulfonyl-4,4'-biphenylene); polycarbonates, such as poly(bisphenol A) or poly(carbonyidioxy-1,4-phenyleneisopropylidene-1,4-phenylene); polyesters, such as poly(ethylene terephthalate), poly(tetramethylene terephthalate), and poly-(cyclohexylene-1,4-dimethylene terephthalate) or poly(oxymethylene-1,4-cyclohexylenemethyleneoxyterephthaloyl); polyaryl sulfides, such as poly(p-phenylene sulfide) or poly(thio-1,4-phenylene); polyimides, such as poly(pyromellitimido-1,4-phenylene); polyolefins, such as polyethylene, polypropylene, poly(1-butene), poly(2-butene), poly(1-pentene), poly(2-pentene), poly(3-methyl-1-pentene), and poly(4-methyl-1-pentene); vinyl polymers, such as poly(vinyl acetate), poly(vinylidene chloride), and poly(vinyl chloride); diene polymers, such as 1,2-poly-1,3-butadiene, 1,4-poly-1,3-butadiene, polyisoprene, and polychloroprene; polystyrenes; copolymers of the foregoing, such as acrylonitrile-butadiene-styrene (ABS) copolymers; and the like.

The term "hard acrylic polymer" as used herein is intended to mean any acrylic polymer which typically has a glass transition temperature ($T_g$) of at least about 0 degrees Celsius. For example, the $T_g$ may be at least about 25 degrees Celsius. As another example, the $T_g$ may be in a range of from about 25 degrees Celsius to about 100 degrees Celsius. A hard acrylic polymer typically will be a polymer formed by the addition polymerization of a mixture of acrylate or methacrylate esters, or both. The ester portion of these monomers may be $C_1$-$C_6$ alkyl groups, such as, for example, methyl, ethyl, and butyl groups. Methyl esters typically impart "hard" properties, while other esters typically impart "soft" properties. The terms "hard" and "soft" are used qualitatively to refer to room-temperature hardness and low-temperature flexibility, respectively. Soft latex polymers generally have glass transition temperatures below about 0 degrees Celsius. These polymers flow too readily and tend to bond to the fabric when heat and pressure are used to effect transfer. Thus, the glass transition temperature correlates fairly well with polymer hardness.

As used herein, the term "cold release properties" means that once an image has been transferred to a substrate, such as cloth or another heat transfer paper, the backing or carrier sheet may be easily and cleanly removed from the substrate after the heat transfer material has cooled to ambient temperature. That is, after cooling, the backing or carrier sheet may be peeled away from the substrate to which an image has been transferred without resisting removal, leaving portions of the image on the carrier sheet, or causing imperfections in the transferred image coating.

DETAILED DESCRIPTION

The present invention relates to first and second matched heat transfer materials. The first heat transfer material is a release sheet material that includes a printable surface. The second heat transfer material is a transfer coat sheet material that includes an outer layer comprising a film forming binder and thermoplastic particles. The present invention also relates to a method of transferring images to substrates using the release sheet material and the transfer coat sheet material.

Release Sheet Material

In FIG. 1, a fragmentary section of a release sheet material 10 is shown. The release sheet material 10 includes a backing, or base, layer 11 having a backing layer exterior surface 14, an optional conformable layer 12, and a release layer 13 overlaying the backing layer, and having a release layer exterior surface 16. An image to be transferred (not shown) may be applied to the release layer exterior surface 16. The optional conformable layer 12 between the backing layer 11 and the release layer 13 facilitates the contact between the release sheet material 10 and a substrate to which the image is to be transferred. The use of conformable layers of this type is described in U.S. patent application Ser. No. 09/614,829, filed Jul. 12, 2000, the entirety of which is incorporated herein by reference.

The backing, or base, layer 11 of the release sheet material is flexible and has first and second surfaces. The backing layer typically will be a film or a cellulosic nonwoven web. In addition to flexibility, the backing layer also should have sufficient strength for handling, coating, sheeting, other operations associated with the manufacture of the release sheet material, and for transfer of the image to a substrate. The basis weight of the base layer generally may vary from about 30 to about 150 g/m$^2$. By way of example, the backing, or base, layer may be a paper such as is commonly used in the manufacture of heat transfer papers. In some embodiments, the backing layer will be a latex-impregnated paper such as described, for example, in U.S. Pat. No. 5,798,179, the entirety of which is incorporated herein by reference. The backing layer is readily prepared by methods that are well known to those having ordinary skill in the art.

The release layer, or coating 13, overlays the first surface of the backing layer or the optional conformable layer. The release coating can be fabricated from a wide variety of materials well known in the art of making peelable labels, masking tapes, etc. For example, silicone polymers are very useful and well known. In addition, many types of lattices such as acrylics, polyvinylacetates, polystyrenes, polyvinyl alcohols, polyurethanes, polyvinychlorides, as well as many copolymer lattices such as ethylene-vinylacetate copolymers, acrylic copolymers, vinyl chloride-acrylics, vinylacetate acrylics, other hard acrylic polymers, and so forth, can be used.

In some cases, it may be helpful to add release agents to the release coatings such as soaps, detergents, silicones etc., as described in U.S. Pat. No. 5,798,179. The amounts of such release agents can then be adjusted to obtain the desired release. For example, the release enhancing additive may include a divalent metal ion salt of a fatty acid, a polyethylene glycol, a polysiloxane surfactant, or a mixture thereof. More particularly, the release-enhancing additive may include calcium stearate, a polyethylene glycol having a molecular weight of from about 2,000 to about 100,000, a siloxane polymer polyether, or a mixture thereof.

The thickness of the release coatings is not critical, and may vary considerably depending upon a number of factors including, but not limited to, the backing layer or conformable layer to be coated. Typically, the release coating layer has a thickness of less than about 2 mil (52 microns). More desirably, the release coating layer has a thickness of from about 0.1 mil to about 1.0 mil. Even more desirably, the release coating layer has a thickness of from about 0.2 mil to about 0.8 mil. The thickness of the release coating layer may also be described in terms of a basis weight. Desirably, the release coating layer has a basis weight of less than about 45 g/m$^2$. More desirably, the release coating layer has a basis weight of from about 2 g/m$^2$ to about 25 g/m$^2$. Even more desirably, the release coating layer has a basis weight of from about 2 g/m$^2$ to about 20 g/m$^2$, and even more desirably from about 4 g/m$^2$ to about 20 g/m$^2$.

The release coating layer is desirably printable with an image that is to be permanently transferred to a substrate. The release coating layer desirably substantially prevents penetration of the image, dyes, pigments and/or toners into the underlying layer. In this regard, the release coating layer is desirably substantially non-porous.

In one embodiment, the release coating layer includes a crosslinked polymer. The cross-linked polymer may be formed from a crosslinkable polymeric binder and a crosslinking agent. The crosslinking agent reacts with the crosslinkable polymeric binder to form a 3-dimensional polymeric structure. Generally, it is contemplated that any pair of polymeric binder and crosslinking agent that reacts to form the 3-dimensional polymeric structure may be utilized. Crosslinkable polymeric binders that may be used are any that may be cross-linked to form a 3-dimensional polymeric structure. Desirable crosslinking binders include those that contain reactive carboxyl groups. Exemplary crosslinking binders that include carboxyl groups include acrylics, polyurethanes, ethylene-acrylic acid copolymers, and so forth. Other desirable crosslinking binders include those that contain reactive hydroxyl groups. Cross-linking agents that can be used to crosslink binders having carboxyl groups include polyfunctional aziridines, epoxy resins, carbodiimide, oxazoline functional polymers, and so forth. Cross-linking agents that can be used to crosslink binders having hydroxyl groups include melamine-formaldehyde, urea formaldehyde, amine-epichlorohydrin, multi-functional isocyanates, and so forth.

In another embodiment, the release coating layer may include a polymeric film forming binder and a particulate material. The film forming binder is applied to the base layer so as to form a film on the surface of the release sheet material. The particulate material may be, for example, clay particles, powdered thermoplastic polymers, diatomaceous earth particles, and so forth.

The release coat material layers that are based on a film-forming binder may be formed on a given underlying layer by known coating techniques, such as by roll, blade, Meyer rod, and air-knife coating procedures. The resulting image transfer material then may be dried by means of, for example, steam-heated drums, air impingement, radiant heating, or some combination thereof. Melt-extruded release coat layers may be applied with an extrusion coater that extrudes molten polymer through a screw into a slot die. The film exits the slot die and flows by gravity onto the base layer or conformable layer. The resulting coated material is passed through a nip to chill the extruded film and bond it to the underlying layer. For less viscous polymers, the molten polymer may not form a self-supporting film. In these cases, the material to be coated may be directed into contact with the slot die or by using rolls to transfer the molten polymer from a bath to the image transfer material.

If desired, the release coating layer may contain other additives, such as processing aids, release agents, pigments, deglossing agents, antifoam agents, surfactants, pH control agents such as ammonium hydroxide, rheology control agents and the like. The use of these and similar materials is well known to those having ordinary skill in the art.

Transfer Coat Sheet Material

Figure 2:
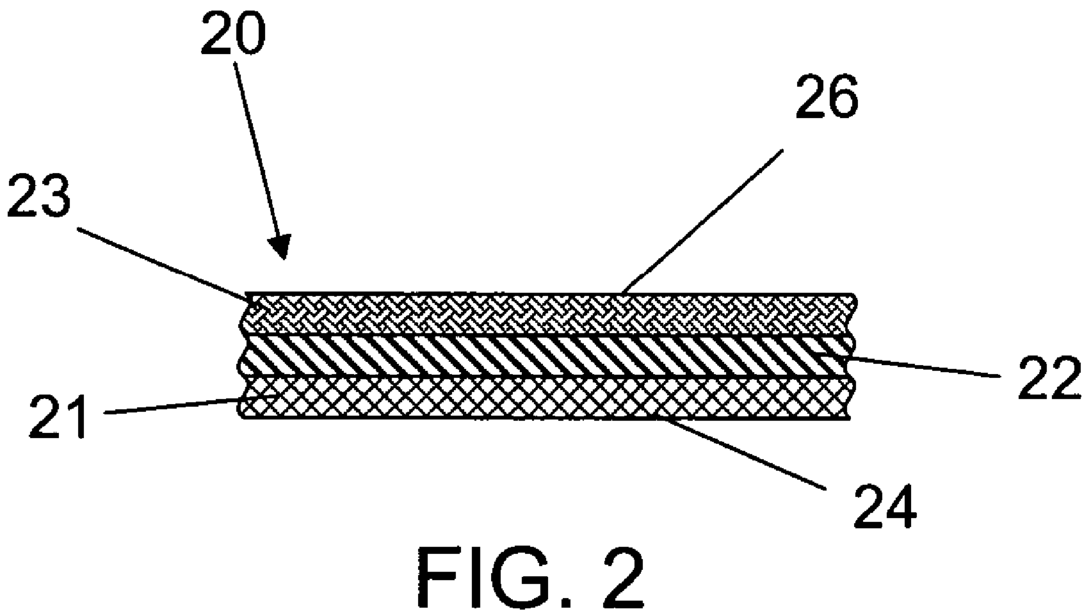
FIG. 2 is a fragmentary sectional view of a transfer coating sheet material made in accordance with the present invention.

Referring now to FIG. 2, a transfer coat sheet material 20 is shown. The transfer coat sheet material 20 includes a backing, or base, layer 21 having a backing layer exterior surface 24, an optional release layer 22 overlaying the backing layer, and one or more transfer coatings 23 overlaying the release layer and having a transfer coating exterior surface 26. Optionally, the transfer coat sheet material 20 may further include a conformable layer (not shown) between the backing layer 21 and the release layer 22 to facilitate the contact between the transfer coating 23 and the printable surface 16 of the release sheet material 10. As mentioned above, the use of conformable layers of this type is described in U.S. patent application Ser. No. 09/614,829, filed Jul. 12, 2000.

In some embodiments, the transfer coat sheet material may have cold-release properties. Heat transfer materials having cold-release properties have been previously disclosed, for example, in U.S. Pat. No. 6,200,668, U.S. Pat. Nos. 5798,179, and 6,428,878, the contents of which are incorporated herein in their entirety. Other heat transfer materials having cold-release properties, for example, are disclosed in U.S. patent application Ser. No. 10/750,387, the entirety of which is incorporated herein by reference.

The backing, or base, layer 21 of the transfer coat sheet material 20 may be substantially as described above for the backing layer of the release sheet material. The backing layer of the transfer coat sheet material is flexible and has first and second surfaces. The flexible backing layer typically will be a film or a cellulosic nonwoven web. In addition to flexibility, the backing layer also should have sufficient strength for handling, coating, sheeting, other operations associated with the manufacture of the transfer coat sheet material, and for removal after transfer. By way of example, the backing layer may be a paper such as is commonly used in the manufacture of heat transfer papers. The backing layer is readily prepared by methods that are well known to those having ordinary skill in the art.

The optional release layer 22 of the transfer coat sheet material may be substantially as described above for the release layer of the release sheet material. The release layer of the transfer coat sheet material overlays the first surface of the backing layer. The basis weight of the release layer generally may vary from about 2 to about 30 g/m$^2$. In one embodiment, the release layer has essentially no tack at transfer temperatures (e.g., 177 degrees Celsius). As used herein, the phrase "having essentially no tack at transfer temperatures" means that the release layer does not stick to the overlying transfer coating to an extent sufficient to adversely affect the quality of the transferred image. By way of illustration, the release layer may include a hard acrylic polymer or poly(vinyl acetate). As another example, the release layer may include a thermoplastic polymer having a $T_g$ of at least about 25 degrees Celsius. As another example, the $T_g$ may be in a range of from about 25 degrees Celsius to about 100 degrees Celsius. Suitable polymers include, for example, polyacrylates, styrene-butadiene copolymers, ethylene vinyl acetate copolymers, nitrile rubbers, poly(vinyl chloride), poly(vinyl acetate), ethylene-acrylate copolymers, and so forth, which have suitable glass transition temperatures.

In another embodiment, the optional release layer of the transfer coat sheet material may include a crosslinked polymer. The cross-linked polymer may be formed from a crosslinkable polymeric binder and a crosslinking agent. The crosslinking agent reacts with the crosslinkable polymeric binder to form a 3-dimensional polymeric structure. Generally, it is contemplated that any pair of the polymeric binders and crosslinking agents described above for the release layer of the release sheet material may be utilized in the release layer of the transfer coat sheet material.

The optional release layer also may include an effective amount of a release-enhancing additive. For example, the release enhancing additive may include a divalent metal ion salt of a fatty acid, a polyethylene glycol, a polysiloxane surfactant, or a mixture thereof. More particularly, the release-enhancing additive may include calcium stearate, a polyethylene glycol having a molecular weight of from about 2,000 to about 100,000, a siloxane polymer polyether, or a mixture thereof.

As mentioned above, the transfer coating overlays the base layer or the optional release layer. The basis weight of the transfer coating generally may vary from about 2 to about 70 g/m$^2$. Desirably, the basis weight of the transfer coating may vary from about 20 to about 50 g/m$^2$, more desirably from about 25 to about 45 g/m$^2$, and even more desirably from about 25 to about 45 g/m$^2$. The transfer coating includes one or more coats or layers of a film-forming binder and a powdered thermoplastic polymer over the base layer or optional release layer. The composition of the coats or layers may be the same or may different. Desirably, the transfer coating will include greater than about 10 percent by weight of the film-forming binder and less than about 90 percent by weight of the powdered thermoplastic polymer. In general, each of the film-forming binder and the powdered thermoplastic polymer will melt in a range of from about 65 degrees Celsius to about 180 degrees Celsius. For example, each of the film-forming binder and powdered thermoplastic polymer may melt in a range of from about 80 degrees Celsius to about 120 degrees Celsius.

In general, any film-forming binder may be employed which meets the criteria specified herein. As a practical matter, water-dispersible ethylene-acrylic acid copolymers have been found to be especially effective film-forming binders.

Similarly, the powdered thermoplastic polymer may be any thermoplastic polymer that meets the criteria set forth herein. For example, the powdered thermoplastic polymer may be a polyamide, polyester, ethylene-vinyl acetate copolymer, polyolefin, and so forth. In addition, the powdered thermoplastic polymer may consist of particles that are from about 2 to about 50 micrometers in diameter.

Manufacturers' published data regarding the melt behavior of film-forming binders or powdered thermoplastic polymers correlate with the melting requirements described herein. It should be noted, however, that either a true melting point or a softening point may be given, depending on the nature of the material. For example, materials such a polyolefins and waxes, being composed mainly of linear polymeric molecules, generally melt over a relatively narrow temperature range since they are somewhat crystalline below the melting point. Melting points, if not provided by the manufacturer, are readily determined by known methods such as differential scanning calorimetry. Many polymers, and especially copolymers, are amorphous because of branching in the polymer chains or the side-chain constituents. These materials begin to soften and flow more gradually as the temperature is increased. It is believed that the ring and ball softening point of such materials, as determined, for example, by ASTM Test Method E-28, is useful in predicting their behavior in the present invention. Moreover, the melting points or softening points described are better indicators of performance in this invention than the chemical nature of the polymer.

The layers applied to the transfer coat sheet material that are based on a film-forming binder may be formed on a given layer by known coating techniques, such as by roll, blade, Meyer rod, and air-knife coating procedures. The resulting image transfer material then may be dried by means of, for example, steam-heated drums, air impingement, radiant heating, or some combination thereof.

For decoration of dark fabrics, the transfer coating may further include an opacifier. The use of opaque layers in heat transfer materials for decoration of dark colored fabrics is described in U.S. patent application Ser. No. 10/003,697, filed Oct. 31, 2001. The opacifier is a particulate material that scatters light at its interfaces so that the transfer coating is relatively opaque. Desirably, the opacifier is white and has a particle size and density well suited for light scattering. Such opacifiers are well known to those skilled in the graphic arts, and include particles of minerals such as aluminum oxide and titanium dioxide or of polymers such as polystyrene. The amount of opacifier needed in each case will depend on the desired opacity, the efficiency of the opacifier, and the thickness of the transfer coating. For example, titanium dioxide at a level of approximately 20 percent in a film of one mil thickness provides adequate opacity for decoration of black fabric materials. Titanium dioxide is a very efficient opacifier and other types generally require a higher loading to achieve the same results.

As mentioned above, the transfer coat sheet material may further include a conformable layer overlaying the base layer and underlying the optional release layer, thereby being located between the base layer and the release layer. In general, the conformable layer may include an extrusion coated polymer that melts in a range of from about 65 degrees Celsius to about 180 degrees Celsius as described above for the release sheet material. As an example, the conformable layer may be an extrusion coating of ethylene vinyl acetate. Alternatively, the conformable layer may include a film-forming binder and/or a powdered thermoplastic polymer. The basis weight of the conformable layer generally may vary from about 5 to about 60 g/m$^2$.

If desired, any of the foregoing film layers of the transfer coat material may contain other materials, such as processing aids, release agents, pigments, particulates such as kaolin clay or diatomaceous earth, deglossing agents, antifoam agents, pH control agents such as ammonium hydroxide, and so forth. The use of these and similar materials is well known to those having ordinary skill in the art.

Methods of Using the Matched Image Transfer Papers

Figure 3A:
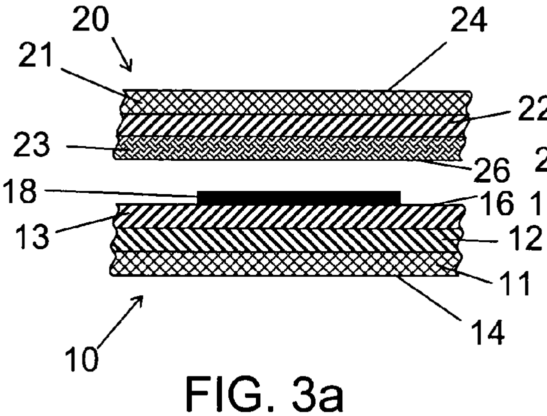
FIGS. 3*a*-3*f* are fragmentary sectional views depicting a method of transferring an image to a substrate using a release sheet transfer material and an transfer coating material in accordance with the present invention; and Repeat use of reference characters in the present specification and drawings is intended to represent same or analogous features or elements of the invention.

It is envisioned that the image transfer papers of the present invention may be used in several different methods of applying printed images to fabrics or other substrate materials. Referring to FIGS. 3*a*-3*f*, an embodiment of a method of transferring an image to a substrate using the release sheet material 10 of FIG. 1 and the transfer coat material 20 of FIG. 2 is depicted. Referring to FIG. 3*a*, an image 18 is applied to the external surface 16 of the release sheet material 10 using a standard imaging device (not shown). Imaging devices compatible with the present invention include, by way of example only, ink jet printers, laser printers and copiers, other toner based printers and copiers, pencils, pens, markers, crayons, and so forth. Desirably, the release sheet material is imaged with toner from a toner based printer or copier. Alternatively, the image 18 may be applied to the transfer coat external surface 16. However, printing to the release sheet material 10 is desirable when using the toner based copiers and printers because the meltable layer or layers 23 on the surface of the transfer coating material 20 may stick to heated fuser rolls in toner based copiers and printers.

Figure 3B:
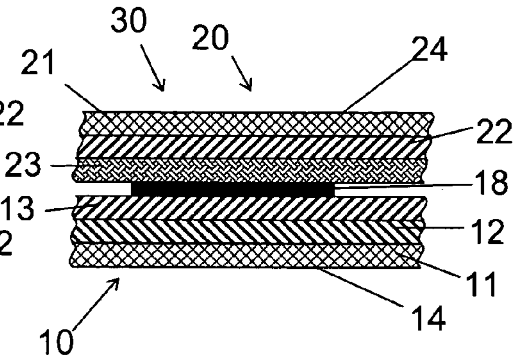

Referring to FIG. 3*b*, after imaging of the release sheet material 10, the imaged release sheet material is placed adjacent the transfer coat material 20 with the transfer coating 23 facing the image 18. Heat and pressure are applied to the backing layer external surface 14, 24 of one or both sides of the two transfer materials 10, 20, causing the transfer coating 23 to fuse or adhere to the imaged surface and form a fused laminate 30. The application of heat and pressure may be effected in a variety of ways known to those skilled in the art. For example, a heat press (not shown) may be used to fuse the layers together. As another example, a standard hand iron (not shown) may be used to apply heat and pressure to the two materials. Desirably, the heat and pressure are applied for an effective period of time to provide good adhesion of the transfer coating 23 to the image 18. Desirably, the temperature used to perform the transfer is less than the melting point of the thermoplastic polymer particles in the transfer coating 23. As such, the transfer coating 23 will desirably remain discontinuous.

Figure 3C:
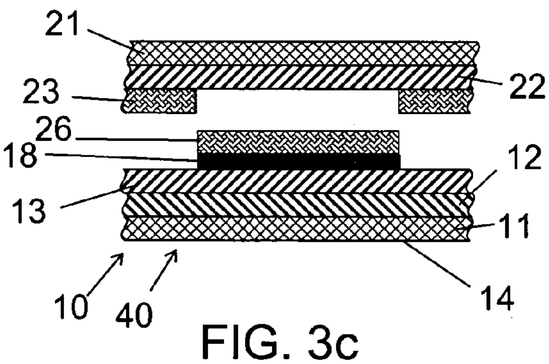

Referring to FIG. 3*c*, the imaged release sheet material 10 is peeled from the fused laminate 30 together with a portion 26 of the transfer coating 23 overlaying the image 18 to form an intermediary transfer material 40. At this point, the image is sandwiched between the release layer 13 and the portion 26 of the transfer coating 23. The release sheet material may be peeled while the transfer coating 23 is still hot, resulting in less than complete transfer of the full thickness of the portion 26 of the transfer coating 23. For this case it is desirable that the detachment force required to separate the portion 26 of the transfer coating 23 is less than the detachment force required to separate the image 18 from the release layer 13 of the release sheet material 10. Alternatively, the release sheet material 10 may be peeled after the transfer coating has cooled so as to provide substantially complete transfer or clean separation of the full thickness of the portion 26 of the transfer coating 23 from the underlying layer. For this case it is desirable that the detachment force required to separate the portion 26 of the transfer coating 23 from the underlying layer of the transfer coat material 20 is less than the detachment force required to separate the image 18 from the release layer 13 of the release sheet material 10.

Figure 3D:
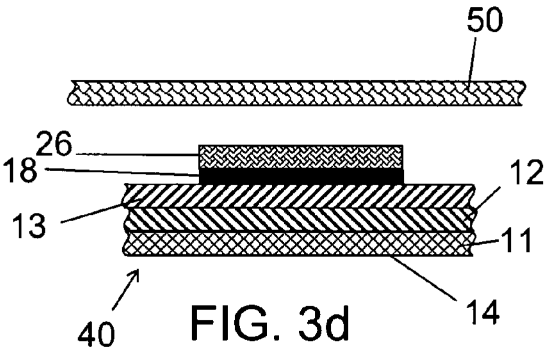
Figure 3E:
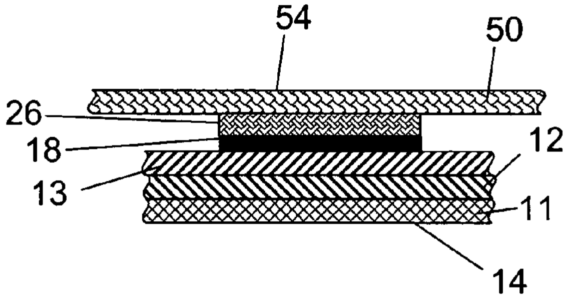
Figure 3F:
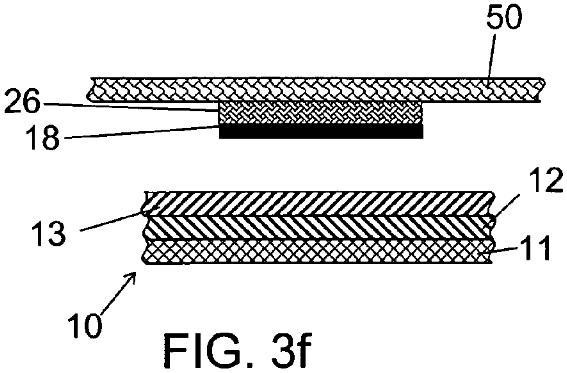

Referring to FIG. 3*d*, the intermediary transfer material 40 is then placed adjacent a substrate 50 with the portion 26 of the transfer coating 23 facing the substrate and the release sheet backing layer 11 facing away from the substrate. Desirable substrates include, for example, fabrics such as 100% cotton T-shirt material, and so forth. Referring to FIG. 3*e*, heat and pressure are then applied to the release sheet external surface 14, a substrate external surface 54, or both to cause the portion 26 of the transfer coating 23 to fuse or adhere to the substrate 50. As above, the amount of heat and pressure as well as duration of application thereof are determined according to the method of application, the type of substrate, and the type of transfer desired. Desirably, the temperature used to perform the transfer is greater than the melting points of the film forming binder and the thermoplastic polymer in the transfer coating 23. As such, the transfer coating will form a durable transfer on the substrate. Referring to FIG. 3*f*, the release sheet material 10 is removed from the substrate 50, leaving the transfer coating 26 and the image attached to the substrate.

In one embodiment, it is envisioned that a matched set of image transfer materials or papers such as described herein may be provided to enable the transfer of printed images to fabrics and other substrates. The matched transfer materials may be provided as a kit in which a supply of both the release sheet material and the transfer coat material may be present in the kit. The release sheet materials and/or the transfer coat materials may be labeled appropriately so as to allow a user to distinguish therebetween. The kit may contain an equal number of the transfer coat materials and the release sheet materials. Alternatively, the kit may contain more of the transfer coat materials than the release sheet materials because it is envisioned that it may be possible to reuse a single release sheet material for more than one image transfer.

The present invention may be better understood with reference to the examples that follow. Such examples, however, are not to be construed as limiting in any way either the spirit or scope of the present invention. In the examples, all parts are parts by weight unless stated otherwise.

EXAMPLES

Series of base substrates, release coating formulations, and powdered polymer coating formulations were produced for use in demonstrating the present invention. The base substrates are defined in Table 1. The release coating formulations are defined in Table 2. The powdered polymer coating formulations are defined in Table 3.

TABLE 1

| Base Substrates | |
|---|---|
| B1: | Cellulosic fiber paper having a basis weight of 90 g/m$^2$ (Supersmooth Classic Crest available from Neenah Paper, Neenah, Wisconsin). |
| B2: | B1 base extrusion coated with a 1.8 mil film of ethylene vinyl acetate (available as Elvax 3200 from DuPont Corporation of Wilmington, Delaware). |
| B3: | B1 base extrusion coated with a 1.0 mil film of low density polyethylene (available as Chevron 1019 from Chevron Phillips Chemical Company LP of Houston, Texas). |
| B4: | B1 base extrusion coated with a 1.8 mil film of ionomer resin (available as Surlyn 1702 from DuPont Corporation). |
| B5: | Saturated label paper having a basis weight of 68 g/m$^2$ saturated with 18% acrylic saturant by weight of the paper fibers. The saturant has 100 dry parts of acrylic latex (available as Rhoplex B 20 from Rohm & Haas of Philadelphia, Pennsylvania), 1 part of ammonia, 0.1 dry parts of dye (available as Ultramarine Blue 5017 dye from Mineral and Pigment Solutions, Inc. of South Plainfield, New Jersey), 16 dry parts of kaolin clay (available as Ultrawhite 90 clay, from Englehard of Iselin, New Jersey), 4 dry parts of titanium dioxide and 1.38 dry parts of water repellent ketene dimer (available as Aquapel 752 from Hercules, Inc. or Wilmington, Delaware). |
| B6: | Saturated paper having a basis weight of 71 g/m$^2$ saturated with 14% polyvinyl alcohol saturant by weight of the coating base. The saturant consisted of 100 dry parts polyvinyl alcohol (available as Airvol 107 from Air Products), 50 dry parts of Titanium Dioxide and 4 dry parts of water repellant (available as Sunsize 137 (from Sun Chemical). |
| B7: | A 95 micron thick polypropylene synthetic paper sheet (available as Kimdura ® FPG 95 from Kimberly-Clark Corporation of Neenah, Wisconsin). |

TABLE 2

| Release coatings | |
|---|---|
| R1: | A mixture of 100 dry parts of hard acrylic latex (available as Rhoplex SP-100 from Rohm & Haas), 3.6 parts of 28% ammonium hydroxide solution (available from EM Industries of Gibbstown, New Jersey), and 5 dry parts of aziridine crosslinking agent (available as XAMA 7 from Sybron Chemicals, Inc. of Birmingham, New Jersey) coated on the base substrate as an aqueous dispersion and dried to a basis weight of 11 g/m$^2$. |
| R2: | The mixture of R1 coated on the base substrate at a basis weight of 5.6 g/m$^2$. |
| R3: | A mixture of 100 dry parts of hard acrylic latex (available as Rhoplex SP-100 from Rohm & Haas), 3.6 parts of 28% ammonium hydroxide solution (available from EM Industries), 5 dry parts of aziridine crosslinking agent (available as XAMA 7 from Sybron Chemicals, Inc.), 10 dry parts of 8000 molecular weight polyethylene oxide (available as Carbowax 8000 from The Dow Chemical Company of Midland, Michigan), 2 dry parts of silicone surfactant release agent (available as Dow Corning Silicone Surfactant 190 available from The Dow Chemical Company), and 0.1 dry part of silicone surfactant wetting agent (available as Dow Corning Silicone surfactant Q2-5211 from The Dow Chemical Company) coated on the base substrate as an aqueous dispersion and dried to a basis weight of 7.5 g/m$^2$. |
| R4: | A mixture of 100 dry parts of hard acrylic latex (available as Rhoplex SP-100 from Rohm & Haas) and 30 dry parts of kaolin clay (available as Ultrawhite 90 clay, from Englehard) coated on the base substrate as an aqueous dispersion and dried to a basis weight of 11 g/m$^2$. |
| R5: | A mixture of 100 dry parts of hard acrylic latex (available as Rhoplex SP-100 from Rohm & Haas), 3.6 parts of 28% ammonium hydroxide solution (available from EM Industries), 10 dry parts of aziridine crosslinking agent (available as XAMA 7 from Sybron Chemicals, Inc.), and 30 dry parts of kaolin clay (available as Ultrawhite 90 clay, from Englehard) coated on the base substrate as an aqueous dispersion and dried to a basis weight of 5.6 g/m$^2$. |
| R6: | A mixture of 100 dry parts of hard acrylic latex (available as Rhoplex SP-100 from Rohm & Haas), 3.6 parts of 28% ammonium hydroxide solution (available from EM Industries), 5 dry parts of aziridine crosslinking agent (available as XAMA 7 from Sybron Chemicals, Inc.), and 20 dry parts of polyvinyl alcohol (available as Airvol 107 from Air Products and Chemicals, Inc. of Allentown, Pennsylvania) coated on the base substrate as an aqueous dispersion and dried to a basis weight of 5.6 g/m$^2$. |
| R7: | A mixture of 100 dry parts of hard acrylic latex (available as Rhoplex SP-100 from Rohm & Haas), 3.6 parts of 28% ammonium hydroxide solution (available from EM Industries), 5 dry parts of aziridine crosslinking agent (available as XAMA 7 from Sybron Chemicals, Inc.), and 20 dry parts of estrified styrene-maleic anhydride (SMA) resin (available as Scripset 540 from Hercules Inc.) coated on the base substrate as an aqueous dispersion and dried to a basis weight of 5.6 g/m$^2$. |

TABLE 2-continued

| Release coatings | |
|---|---|
| R8: | A mixture of 100 dry parts of hard acrylic latex (available as Rhoplex SP-100 from Rohm & Haas), 3.6 parts of 28% ammonium hydroxide solution (available from EM Industries), 10 dry parts of aziridine crosslinking agent (available as XAMA 7 from Sybron Chemicals, Inc.), and 10 dry parts of calcium stearate dispersion (available as Nopcote C104 from Geo Specialty Chemicals, Inc. of Cleveland, Ohio) coated on the base substrate as an aqueous dispersion and dried to a basis weight of 5.6 g/m$^2$. |
| R9: | A mixture of 100 dry parts of hard acrylic latex (available as Rhoplex SP-100 from Rohm & Haas), 3.6 parts of 28% ammonium hydroxide solution (available from EM Industries), 10 dry parts of aziridine crosslinking agent (available as XAMA 7 from Sybron Chemicals, Inc.), and 20 dry parts of calcium stearate dispersion (available as Nopcote C104 from Geo Specialty Chemicals, Inc. of Cleveland, Ohio) coated on the base substrate as an aqueous dispersion and dried to a basis weight of 5.6 g/m$^2$. |
| R10: | A mixture of 100 dry parts of hard acrylic latex (available as Rhoplex SP-100 from Rohm & Haas), 3.6 parts of 28% ammonium hydroxide solution (available from EM Industries), 10 dry parts of aziridine crosslinking agent (available as XAMA 7 from Sybron Chemicals, Inc.), and 20 dry parts of 8000 molecular weight polyethylene oxide (available as Carbowax 8000 from The Dow Chemical Company) coated on the base substrate as an aqueous dispersion and dried to a basis weight of 5.6 g/m$^2$. |
| R11: | A mixture of 100 dry parts of hard acrylic latex (available as Rhoplex SP-100 from Rohm & Haas), 3.6 parts of 28% ammonium hydroxide solution (available from EM Industries), 10 dry parts of aziridine crosslinking agent (available as XAMA 7 from Sybron Chemicals, Inc.), and 20 dry parts of polyethylene oxide (available as Polyox N80 from The Dow Chemical Company) coated on the base substrate as an aqueous dispersion and dried to a basis weight of 7.5 g/m$^2$. |
| R12: | A mixture of 100 dry parts of hard acrylic latex (available as Rhoplex SP-100 from Rohm & Haas), 3.6 parts of 28% ammonium hydroxide solution (available from EM Industries), 5 dry parts of aziridine crosslinking agent (available as XAMA 7 from Sybron Chemicals, Inc.), and 10 dry parts of polyethylene oxide (available as Polyox N80 from The Dow Chemical Company) coated on the base substrate as an aqueous dispersion and dried to a basis weight of 7.5 g/m$^2$. |
| R13: | The mixture of R11 coated on the base substrate at a basis weight of 11 g/m$^2$. |
| R14: | The mixture of R11 coated on the base substrate at a basis weight of 3.8 g/m$^2$. |
| R15: | A mixture of 100 dry parts of hard acrylic latex (available as Rhoplex SP-100 from Rohm & Haas), 3.6 parts of 28% ammonium hydroxide solution (available from EM Industries), 5 dry parts of aziridine crosslinking agent (available as XAMA 7 from Sybron Chemicals, Inc.), and 20 dry parts of polyethylene oxide (available as Polyox N80 from The Dow Chemical Company) coated on the base substrate as an aqueous dispersion and dried to a basis weight of 7.5 g/m$^2$. |
| R16: | The mixture of R12 coated on the base substrate at a basis weight of 13 g/m$^2$. |
| R17: | A mixture of 100 dry parts of hard acrylic latex (available as Rhoplex SP-100 from Rohm & Haas), 3.6 parts of 28% ammonium hydroxide solution (available from EM Industries), 5 dry parts of aziridine crosslinking agent (available as XAMA 7 from Sybron Chemicals, Inc.), and 20 dry parts of 8000 molecular weight polyethylene oxide (available as Carbowax 8000 from The Dow Chemical Company) coated on the base substrate as an aqueous dispersion and dried to a basis weight of 13 g/m$^2$. |
| R18: | A mixture of 100 dry parts of ethylene acrylic acid dispersion (available as Michem Prime 4983 from Michelman Inc. of Cincinnati, Ohio), 3.6 parts of 28% ammonium hydroxide solution (available from EM Industries), 20 dry parts of aziridine crosslinking agent (available as XAMA 7 from Sybron Chemicals, Inc.), and 3 dry parts of nonionic surfactant (available as Triton X100 from The Dow Chemical Company) coated on the base substrate as an aqueous dispersion and dried to a basis weight of 7.5 g/m$^2$. |
| R19: | A mixture of 100 dry parts of acrylic release coat (available as Degree 100A from Solv, Inc. of Rock Hill, SC), 3.6 parts of 28% ammonium hydroxide solution (available from EM Industries), and 5 dry parts of aziridine crosslinking agent (available as XAMA 7 from Sybron Chemicals, Inc. of Birmingham, New Jersey) coated on the base substrate as an aqueous dispersion and dried to a basis weight of 5.6 g/m$^2$. |
| R20: | A mixture of 100 dry parts of acrylic release coat (available as Degree 100A from Solv, Inc.), 3.6 parts of 28% ammonium hydroxide solution (available from EM Industries), 5 dry parts of aziridine crosslinking agent (available as XAMA 7 from Sybron Chemicals, Inc. of Birmingham, New Jersey), 3 dry parts of nonionic surfactant (available as Triton X100 from The Dow Chemical Company), and 10 dry parts of 8000 molecular weight polyethylene oxide (available as Carbowax 8000 from The Dow Chemical Company) coated on the base substrate as an aqueous dispersion and dried to a basis weight of 7.5 g/m$^2$. |
| R21: | A mixture of 100 dry parts of acrylic release coat (available as Degree 100A from Solv, Inc.), 3.6 parts of 28% ammonium hydroxide solution (available from EM Industries), 5 dry parts of aziridine crosslinking agent (available as XAMA 7 from Sybron Chemicals, Inc. of Birmingham, New Jersey), 3 dry parts of nonionic surfactant (available as Triton X100 from The Dow Chemical Company), and 20 dry parts of polyethylene oxide (available as Polyox N80 from The Dow Chemical Company) coated on the base substrate as an aqueous dispersion and dried to a basis weight of 7.5 g/m$^2$. |

TABLE 2-continued

| Release coatings | |
|---|---|
| R22: | A mixture of 100 dry parts of acrylic release coat (available as Degree 100A from Solv, Inc.), 3.6 parts of 28% ammonium hydroxide solution (available from EM Industries), 5 dry parts of aziridine crosslinking agent (available as XAMA 7 from Sybron Chemicals, Inc. of Birmingham, New Jersey), 3 dry parts of nonionic surfactant (available as Triton X100 from The Dow Chemical Company), 20 dry parts of polyethylene oxide (available as Polyox N80 from The Dow Chemical Company), and 25 dry parts of powdered polyamide (10 micron average particle size) (available as Orgasol 3501 EXD NAT 1 from Atofina Chemicals Inc. of Philadelphia, Pennsylvania) coated on the base substrate as an aqueous dispersion and dried to a basis weight of 7.5 g/m$^2$. |
| R23: | A mixture of 100 dry parts of acrylic release coat (available as Degree 100A from Solv, Inc.), 3.6 parts of 28% ammonium hydroxide solution (available from EM Industries), 5 dry parts of aziridine crosslinking agent (available as XAMA 7 from Sybron Chemicals, Inc. of Birmingham, New Jersey), 3 dry parts of nonionic surfactant (available as Triton X100 from The Dow Chemical Company), 20 dry parts of polyethylene oxide (available as Polyox N80 from The Dow Chemical Company), and 20 dry parts of powdered high density polyethylene wax (5 micron average particle size) (available as MPP 635G from Micropowders Inc. of Tarrytown, New York) coated on the base substrate as an aqueous dispersion and dried to a basis weight of 7.5 g/m$^2$. |
| R24: | A mixture of 100 dry parts of kaolin clay (available as Ultrawhite 90 clay, from Englehard) and 25 dry parts of acrylic latex (available as Hycar 26084 from Noveon Inc. of Cleveland, Ohio) coated on the base substrate as an aqueous dispersion and dried to a basis weight of 20 g/m$^2$. |
| R25: | A mixture of 100 dry parts of acrylic latex (available as Hycar 26706 from Noveon Inc.) and 20 dry parts of 20,000 molecular weight polyethylene oxide (available as PEG 20M from The Dow Chemical Company) coated on the base substrate as an aqueous dispersion and dried to a basis weight of 11 g/m$^2$. |
| R26: | A mixture of 100 dry parts of acrylic latex (available as Hycar 26672 from Noveon Inc.), 25 dry parts of calcium stearate dispersion (available as Nopcote C104 from Geo Specialty Chemicals, Inc.), 20 dry parts of 20,000 molecular weight polyethylene oxide (available as PEG 20M from The Dow Chemical Company), 2 dry parts of nonionic surfactant (available as Triton X100 from The Dow Chemical Company), and 30 dry parts of diatomaceous earth (available as Dafil 530 from Celite Corporation of Santa Barbara, California) coated on the base substrate as an aqueous dispersion and dried to a basis weight of 11 g/m$^2$. |
| R27: | A mixture of 100 dry parts of acrylic release coat (available as Degree 238 from Solv, Inc.), 3.6 parts of 28% ammonium hydroxide solution (available from EM Industries), and 5 dry parts of aziridine crosslinking agent (available as XAMA 7 from Sybron Chemicals, Inc. of Birmingham, New Jersey) coated on the base substrate as an aqueous dispersion and dried to a basis weight of 7.5 g/m$^2$. |
| R28: | The mixture of R17 coated on the base substrate at a basis weight of 7.5 g/m$^2$. |

TABLE 3

| Powdered polymer coatings | |
|---|---|
| P1: | A mixture of 100 dry parts of powdered polyamide (10 micron average particle size) (available as Orgasol 3501 EXD NAT 1 from Atofina Chemicals Inc.), 1 part of cyclohexane dimethanol dibenzoate, ground to an average particle size of 8 microns (available as Benzoflex 352 from Velsicol Chemical Corporation of Rosemont, Illinois), 70 dry parts of ethylene acrylic acid dispersion (available as Michem Prime 4983 from Michelman Inc.), 6 dry parts of nonionic surfactant (available as Triton X100 from The Dow Chemical Company), and 5 dry parts of polyethylene oxide (available as Polyox N80 from The Dow Chemical Company) coated on the underlying layer as a 30% solids content aqueous dispersion and dried to a basis weight of 26 g/m$^2$. |
| P2: | The mixture of P1 coated on the underlying layer at a basis weight of 21 g/m$^2$. |
| P3: | A mixture of 50 dry parts of powdered polyamide (10 micron average particle size) (available as Orgasol 3501 EXD NAT 1 from Atofina Chemicals Inc.), 51.5 parts of cyclohexane dimethanol dibenzoate, ground to an average particle size of 8 microns (available as Benzoflex 352 from Velsicol Chemical Corporation of Rosemont, Illinois), 100 dry parts of ethylene acrylic acid dispersion (available as Michem Prime 4983 from Michelman Inc.), 40 dry parts of powdered high density polyethylene wax (5 micron average particle size) (available as MPP 635G from Micropowders Inc.), and 4.5 dry parts of nonionic surfactant (available as Tergitol 15-S-40 from The Dow Chemical Company) coated on the underlying layer as a 30% solids content aqueous dispersion and dried to a basis weight of 15 g/m$^2$. |
| P4: | The same as P1, but only 2 dry parts of polyethylene oxide. |
| P5: | A mixture of 100 dry parts of powdered polyamide (10 micron average particle size) (available as Orgasol 3501 EXD NAT 1 from Atofina Chemicals Inc.), 40 parts of cyclohexane dimethanol dibenzoate, ground to an average particle size of 8 microns (available as Benzoflex 352 from Velsicol Chemical Corporation), 70 dry parts of ethylene acrylic acid dispersion (available as Michem Prime 4983 from Michelman Inc.), 6 dry parts of nonionic surfactant (available as Triton X100 |

TABLE 3-continued

| Powdered polymer coatings | |
|---|---|
| | from The Dow Chemical Company), 2 dry parts of polyethylene oxide (available as Polyox N60k from The Dow Chemical Company), and 8 dry parts of 8000 molecular weight polyethylene oxide (available as Carbowax 8000 from The Dow Chemical Company) coated on the underlying layer as a 30% solids content aqueous dispersion and dried to a basis weight of 26 g/$m^2$. |
| P6: | A mixture of 50 dry parts of ethylene acrylic acid dispersion (available as Michem Prime 4983 from Michelman Inc.), 100 dry parts of powdered polypropylene wax (10 micron average particle size) (available as Propylmatte 31 from Micropowders Inc.), 3 dry parts of nonionic surfactant (available as Triton X100 from The Dow Chemical Company), and 5 dry parts of polyethylene oxide (available as Polyox N80 from The Dow Chemical Company) coated on the underlying layer as a 30% solids content aqueous dispersion and dried to a basis weight of 26 g/$m^2$. |
| P7: | A mixture of 20 dry parts of ethylene acrylic acid dispersion (available as Michem Prime 4983 from Michelman Inc.), 100 dry parts of powdered high density polyethylene wax (5 micron average particle size) (available as MPP 635G from Micropowders Inc.), and 3 dry parts of nonionic surfactant (available as Triton X100 from The Dow Chemical Company) coated on the underlying layer as a 30% solids content aqueous dispersion and dried to a basis weight of 7.5 g/$m^2$. |
| P8: | A mixture of 100 dry parts of powdered polyamide (10 micron average particle size) (available as Orgasol 3501 EXD NAT 1 from Atofina Chemicals Inc.), 70 dry parts of ethylene acrylic acid dispersion (available as Michem Prime 4983 from Michelman Inc.), 40 dry parts of powdered high density polyethylene wax (5 micron average particle size) (available as MPP 635G from Micropowders Inc.), 6 dry parts of nonionic surfactant (available as Triton X100 from The Dow Chemical Company), and 5 dry parts of polyethylene oxide (available as Polyox N80 from The Dow Chemical Company) coated on the underlying layer as a 30% solids content aqueous dispersion and dried to a basis weight of 24 g/$m^2$. |
| P9: | A mixture of 100 dry parts of powdered polyamide (10 micron average particle size) (available as Orgasol 3501 EXD NAT 1 from Atofina Chemicals Inc.), 70 dry parts of ethylene acrylic acid dispersion (available as Michem Prime 4983 from Michelman Inc.), 40 dry parts of powdered polypropylene wax (10 micron average particle size) (available as Propylmatte 31 from Micropowders Inc.), 6 dry parts of nonionic surfactant (available as Triton X100 from The Dow Chemical Company), and 5 dry parts of polyethylene oxide (available as Polyox N80 from The Dow Chemical Company) coated on the underlying layer as a 30% solids content aqueous dispersion and dried to a basis weight of 24 g/$m^2$. |
| P10: | A mixture of 100 dry parts of powdered polyamide (10 micron average particle size) (available as Orgasol 3501 EXD NAT 1 from Atofina Chemicals Inc.), 70 dry parts of ethylene acrylic acid dispersion (available as Michem Prime 4983 from Michelman Inc.), 40 dry parts of powdered high density polyethylene wax (5 micron average particle size) (available as MPP 635G from Micropowders Inc.), 6 dry parts of nonionic surfactant (available as Triton X100 from The Dow Chemical Company), and 20 dry parts of polyethylene oxide (available as Polyox N80 from The Dow Chemical Company) coated on the underlying layer as a 30% solids content aqueous dispersion and dried to a basis weight of 26 g/$m^2$. |
| P11: | A mixture of 100 dry parts of ethylene acrylic acid wax dispersion (available as Michem Prime 58035 from Michelman Inc.), 100 dry parts of powdered high density polyethylene wax (5 micron average particle size) (available as MPP 635G from Micropowders Inc.), and 3.6 parts of 28% ammonium hydroxide solution (available from EM Industries) coated on the underlying layer as a 30% solids content aqueous dispersion and dried to a basis weight of 11 g/$m^2$. |
| P12: | A mixture of 40 dry parts of powdered polyamide (10 micron average particle size) (available as Orgasol 3501 EXD NAT 1 from Atofina Chemicals Inc.), 100 dry parts of ethylene acrylic acid dispersion (available as Michem Prime 4990R from Michelman Inc.), 2 dry parts of nonionic surfactant (available as Tergitol 15-S-40 from The Dow Chemical Company), and 0.2 dry parts of polyethylene oxide (available as Polyox N60k from The Dow Chemical Company) coated on the underlying layer as a 30% solids content aqueous dispersion and dried to a basis weight of 15 g/$m^2$. |
| P13: | A mixture of 100 dry parts of powdered polyamide (10 micron average particle size) (available as Orgasol 3501 EXD NAT 1 from Atofina Chemicals Inc.), 25 dry parts of ethylene acrylic acid dispersion (available as Michem Prime 4990R from Michelman Inc.), 3 dry parts of nonionic surfactant (available as Tergitol 15-S-40 from The Dow Chemical Company), 2 dry parts of nonionic surfactant (available as Triton X100 from The Dow Chemical Company), 1 dry part sodium carbonate, and 2 dry parts of polyethylene oxide (available as Polyox N60k from The Dow Chemical Company) coated on the underlying layer as a 30% solids content aqueous dispersion and dried to a basis weight of 15 g/$m^2$. |
| P14: | A mixture of 11 dry parts of ethylene acrylic acid wax dispersion (available as Michem Prime 58035 from Michelman Inc.), 100 dry parts of powdered high density polyethylene wax (5 micron average particle size) (available as MPP 635G from Micropowders Inc.), and 3 dry parts of nonionic surfactant (available as Triton X100 from The Dow Chemical Company) coated on the underlying layer as a 30% solids content aqueous dispersion and dried to a basis weight of 23 g/$m^2$. |

TABLE 3-continued

| Powdered polymer coatings | |
|---|---|
| P15: | A mixture of 100 dry parts of ethylene acrylic acid dispersion (available as Michem Prime 4990R from Michelman Inc.), 100 dry parts of powdered high density polyethylene wax (5 micron average particle size) (available as MPP 635G from Micropowders Inc.), and 3 dry parts of nonionic surfactant (available as Triton X100 from The Dow Chemical Company) coated on the underlying layer as a 30% solids content aqueous dispersion and dried to a basis weight of 15 g/$m^2$. |
| P16: | A mixture of 100 dry parts of powdered polyamide (10 micron average particle size) (available as Orgasol 3501 EXD NAT 1 from Atofina Chemicals Inc.), 25 dry parts of ethylene acrylic acid dispersion (available as Michem Prime 4983 from Michelman Inc.), 5 dry parts of nonionic surfactant (available as Triton X100 from The Dow Chemical Company), and 5 dry parts of polyacrylic acid dispersant (available as Tamol 731 from Rohm and Haas Company) coated on the underlying layer as a 30% solids content aqueous dispersion and dried to a basis weight of 13 g/$m^2$. |
| P17: | A mixture of 100 dry parts of powdered polyamide (10 micron average particle size) (available as Orgasol 3501 EXD NAT 1 from Atofina Chemicals Inc.), 40 dry parts of powdered high density polyethylene wax (5 micron average particle size) (available as MPP 635G from Micropowders Inc.), 70 dry parts of ethylene acrylic acid dispersion (available as Michem Prime 4983 from Michelman Inc.), 6 dry parts of nonionic surfactant (available as Triton X100 from The Dow Chemical Company), and 10 dry parts of 8000 molecular weight polyethylene oxide (available as Carbowax 8000 from The Dow Chemical Company) coated on the underlying layer as a 30% solids content aqueous dispersion and dried to a basis weight of 26 g/$m^2$. |

Additionally, the following base coating formulation was prepared having only binders without any powdered polymers:

| | |
|---|---|
| BC1: | A mixture of 100 dry parts of ethylene acrylic acid wax dispersion (available as Michem Prime 58035 from Michelman Inc.) and 25 dry parts of ethylene acrylic acid dispersion (available as Michem Prime 4983 from Michelman Inc.) coated on the underlying layer as a 30% solids content aqueous dispersion and dried to a basis weight of 13 g/$m^2$. |

Table 4 summarizes the constructions of the release sheet materials that were produced using the base substrates of Table 1 and the release coatings of Table 2 to demonstrate the present invention.

TABLE 4

Release Sheet designs

| Sample ID | Base Substrate | Release Coat |
|---|---|---|
| RS1 | B1 | none |
| RS2 | B1 | R1 |
| RS3 | B2 | R2 |
| RS4 | B2 | R3 |
| RS5 | B2 | R5 |
| RS6 | B2 | R6 |
| RS7 | B2 | R7 |
| RS8 | B2 | R8 |
| RS9 | B2 | R9 |
| RS10 | B2 | R10 |
| RS11 | B2 | R11 |
| RS12 | B3 | R11 |
| RS13 | B3 | R12 |
| RS14 | B3 | R13 |
| RS15 | B3 | R14 |
| RS16 | B3 | R15 |
| RS17 | B3 | R18 |
| RS18 | B3 | R19 |
| RS19 | B1 | R19 |
| RS20 | B4 | R20 |
| RS21 | B4 | R21 |
| RS22 | B4 | R22 |
| RS23 | B4 | R23 |
| RS24 | B5 | R24 |
| RS25 | B1 | R25 |
| RS26 | B6 | R26 |
| RS27 | B4 | R27 |

TABLE 4-continued

Release Sheet designs

| Sample ID | Base Substrate | Release Coat |
|---|---|---|
| RS28 | B3 | R17 |
| RS29 | B3 | R28 |

Table 5 summarizes the constructions of the transfer coat sheet materials that were produced using the base substrates of Table 1, the release coatings of Table 2, and the powdered polymer coatings of Table 3 to demonstrate the present invention.

TABLE 5

Powdered Polymer sheet Designs

| | | | Transfer Coats | | |
|---|---|---|---|---|---|
| Sampe ID | Base Substrate | Release Coat | #1 | #2 | #3 |
| PS1 | B2 | R3 | P1 | | |
| PS2 | B2 | R3 | P2 | | |
| PS3 | B2 | R3 | P3 | P4 | |
| PS4 | B2 | R3 | P5 | | |
| PS5 | B2 | R3 | P6 | | |
| PS6 | B2 | R12 | P1 | P7 | |
| PS7 | B3 | R12 | P1 | P7 | |
| PS8 | B3 | R12 | P8 | | |
| PS9 | B3 | R12 | P9 | | |
| PS10 | B1 | R17 | P10 | | |
| PS11 | B5 | R24 | BC1 | P14 | |
| PS12 | B6 | R26 | P11 | P12 | P13 |
| PS13 | B1 | R25 | P15 | P16 | |
| PS14 | B7 | NONE | P10 | | |
| PS15 | B1 | NONE | P11 | P10 | |

TABLE 5-continued

Powdered Polymer sheet Designs

| Sampe ID | Base Substrate | Release Coat | Transfer Coats #1 | #2 | #3 |
|---|---|---|---|---|---|
| PS16 | B7 | NONE | P17 | | |
| PS17 | B1 | NONE | P11 | P17 | |
| PS18 | B1 | R4 | P10 | | |
| PS19 | B1 | R17 | P10 | P7 | |
| PS20 | B1 | NONE | P11 | P10 | P7 |
| PS21 | B7 | NONE | P11 | P10 | P7 |
| PS22 | B7 | NONE | P17 | P7 | |

Image transfer experiments were performed using two transfer steps. Each experiment utilized a release sheet from Table 4 and a powdered polymer coated sheet from Table 5. The release sheet was imaged using a Canon 700 color Copier, unless noted otherwise. The first transfer step was carried out by heat pressing the imaged release sheet against the powdered polymer sheet in a heat press for the times and temperatures indicated. The powdered polymer coated sheet substrate was removed after cooling of the sheet materials. The second transfer step was done by heat pressing the release sheet (with the image and attached powdered polymer coating) against a 100% cotton Tee shirt material for 30 seconds at 350 degrees F., then removing the release sheet base substrate while the release sheet was still hot. Thereafter, the transferred images were evaluated according to how well the image was transferred, including how well the polymer coating was limited to the printed areas. Table 6 summarizes the cold peel/hot peel experiments with the Canon 700 color copier images.

As discussed above, in the cold peel/hot peel experiments, the step of removing the powdered polymer transfer base substrate was done after cooling of the sheet materials, and the step of removing the release sheet base substrate was done while the sheet material was still hot. Under these conditions, the release coating in the transfer coat sheet material with the powdered polymer coating functions as a true release coating. However, the release coating on the release sheet material acts more like a barrier layer, since the separation occurs within the melted toner. When this is the case, less than 100% of the toner may be transferred to the fabric. The actual amount which is transferred to the fabric depends on the structure of the release sheet. If the release sheet is plain paper, most of the toner stays on the paper. More of the toner transfers if there is a barrier layer on the release sheet, but still only about 50%. Results are much improved if the release sheet has a meltable conformable film layer under the release (barrier) coat since this allows the release sheet to conform to the fabric substrate. It has generally been seen that thinner or more conformable release coatings give better transfers in these designs. For example, release coatings including polyethylene oxides tend to perform better than those with large amounts of crosslinker (XAMA 7) or clay.

Some of the experiments resulted in small amounts of the powdered polymer coating transferring to the non-imaged areas of the release sheet in the first step. However, after the second transfer step, the background, or non-imaged areas of the fabric substrate did not appear significantly different than on those fabrics to which no polymer coating transferred in the non-printed areas.

TABLE 6

Cold Peel/Hot Peel Experiments With Canon 700 Color Laser Copier Images

| Sheet1 (see Table 4) | Sheet2 (see Table 5) | Temp1 (deg F.) | Time(sec) | Results | Comments |
|---|---|---|---|---|---|
| RS1 | PS1 | 250 | 30 | poor | 1 |
| RS2 | PS1 | 250 | 30 | poor | 2 |
| RS3 | PS1 | 250 | 30 | fair | 3 |
| RS4 | PS1 | 250 | 30 | fair | 4 |
| RS4 | PS1 | 250 | 30 | fair | 4, 15 |
| RS4 | PS2 | 250 | 30 | fair | 4, 5 |
| RS5 | PS1 | 250 | 30 | poor | 6 |
| RS6 | PS1 | 250 | 30 | poor | 7 |
| RS7 | PS1 | 250 | 30 | poor | 7 |
| RS8 | PS1 | 250 | 30 | poor | 7 |
| RS9 | PS1 | 250 | 30 | poor | 7 |
| RS10 | PS1 | 250 | 30 | fair | 4 |
| RS11 | PS1 | 250 | 30 | good | 8, 13 |
| RS12 | PS1 | 250 | 30 | good | 8 |
| RS12 | PS6 | 250 | 30 | good | 9 |
| RS12 | PS7 | 250 | 30 | good | 9, 13 |
| RS3 | PS3 | 250 | 30 | poor | 10 |
| RS13 | PS4 | 250 | 30 | fair | 8 |
| RS10 | PS5 | 250 | 30 | good | 11, 13 |
| RS14 | PS8 | 250 | 30 | good | 9 |
| RS14 | PS9 | 250 | 30 | good | 9, 13 |
| RS16 | PS10 | 250 | 30 | good | 9, 13 |
| RS16 | PS18 | 250 | 30 | good | 9, 13 |
| RS17 | PS10 | 250 | 30 | poor | 3 |
| RS24 | PS11 | 250 | 30 | poor | 1 |
| RS16 | PS11 | 250 | 30 | fair | 11 |
| RS16 | PS12 | 250 | 30 | good | 12, 14 |
| RS25 | PS13 | 250 | 30 | poor | 2 |
| RS16 | PS13 | 250 | 30 | good | 9, 13 |

Table 6 Comments:

1. In the second step, less than half of the toner transferred to the fabric.
2. In the second transfer step, only about half the toner transferred to the fabric
3. In the first transfer step, polymer transferred well to the imaged areas but considerable transfer also occurred in the non-imaged areas.
4. Polymer transferred well to the imaged areas in the first step but small spots of toner transferred in the polymer sheet.
5. The image was fuzzy.
6. The first transfer step worked well, but only about two thirds of the toner transferred to the fabric in the second step.
7. Considerable amounts of toner transferred to the polymer sheet in the first step.
8. The first transfer step worked well, but small amounts of polymer transferred to the non-imaged areas.
9. Both steps worked well. The transfers on the fabric were sometimes fuzzy.
10. Transfer of polymer occurred in the imaged areas in the first step, but slivers of polymer transferred along the edges of the imaged areas. The slivers could be removed with adhesive tape and the second transfer step to fabric worked well.
11. Both transfer steps worked well. The image was a little duller than the others.
12. Both transfer steps worked well. There was a very thin layer of polymer transferred to the non-imaged areas in the first step.
13. Samples were washed and dried 5 times. There was a little color fading and a little fuzziness after 5 washes.
14. Samples were washed and dried 5 times. There was considerable color fade after 5 washes.

15. The powdered polymer sheet was imaged with the printer rather than imaging the release sheet.

A second set of experiments was performed, again using release sheets from Table 4 and powdered polymer coated sheets from Table 5. The release sheets were imaged using a Canon 700 color copier. The first transfer step was done by pressing the imaged release sheet against the powdered polymer sheet in a heat press for the indicated times and temperatures. The transfer coat sheet base substrate was removed while the sheet materials were still hot. The second transfer step was done by pressing the imaged release sheet with the attached powdered polymer coating to a 100% cotton Tee shirt material for 30 seconds at 350 degrees F. The release sheet base substrate was then removed while the sheet material was still hot. As such, the transfer steps can be classified as "hot peel/hot peel". Thereafter, the transferred images were evaluated according to how well the image was transferred, including how well the polymer coating was limited to the printed areas. Table 7 summarizes the hot peel/hot peel experiments with the Canon 700 color copier images.

In the first transfer step, the separation occurs within one of the powdered polymer coating layers because the coating still at least partially molten. In the first transfer step, the binders are probably molten when the sheets are separated. It is advantageous to utilize a powdered polymer coating having a low melting point and/or a low melt viscosity binder in the powdered polymer coating since this will make separation easier. A two-layered powdered polymer coating with the first powdered polymer coating (the one closest to the base substrate) having the low melting point and/or low melt viscosity binder is especially desirable. The second transfer step for the experiments summarized in Table 7 is substantially as described above for Table 6.

TABLE 7

Hot Peel/Hot Peel Experiments With Canon 700 Color Copier Images

| Sheet1 (see Table 4) | Sheet2 (see Table 5) | Temp1 (deg F.) | Time(sec) | Results | Comments |
|---|---|---|---|---|---|
| RS16 | PS10 | 250 | 30 | good | 1, 5 |
| RS16 | PS10 | 210 | 10 | good | 1 |
| RS16 | PS10 | 210 | 30 | good | 1 |
| RS16 | PS14 | 250 | 15 | good | 1, 5 |
| RS16 | PS15 | 250 | 15 | good | 1, 5 |
| RS17 | PS10 | 250 | 30 | good | 1, 5 |
| RS24 | PS11 | 250 | 30 | poor | 2 |
| RS25 | PS13 | 250 | 30 | poor | 2 |
| RS16 | PS11 | 250 | 30 | fair | 3, 6 |
| RS16 | PS13 | 250 | 30 | good | 1, 5 |
| RS16 | PS12 | 250 | 30 | good | 4, 6 |
| RS17 | PS12 | 250 | 30 | good | 4, 6 |
| RS28 | PS10 | 240 | 15 | good | |
| RS29 | PS10 | 240 | 15 | good | |
| RS29 | PS15 | 240 | 15 | good | |
| RS29 | PS15 | 210 | 20 | good | |

Table 7 Comments:
1. The transfers worked well. The images were sometimes a little fuzzy.
2. The first step worked well but only about half of the toner transferred in the second step.
3. The transfers worked well but the image was dull.
4. A thin film of polymer transferred to the non-imaged areas of the release sheet in the first step. The second step worked well.
5. Samples were washed and dried 5 times. There was some color fading and fuzziness after 5 washes.
6. Samples were washed and dried 5 times. There was considerable color fading after 5 washes.

A third set of experiments was performed, again using release sheets from Table 4 and powdered polymer coated sheets from Table 5. The release sheets were imaged using a Canon 700 color copier. The first transfer step was done by pressing the imaged release paper against the polymer coated sheet in a Tee shirt press for the indicated time and temperature, then removing the base substrate of the polymer coated sheet while the sheets were still hot. The second step was done by pressing the imaged release sheet with the attached powdered polymer against a 100% cotton Tee shirt material for 30 seconds at 350 degrees F. The sheets were allowed to cool prior to removing the base substrate from the release sheet material. As such, the transfer steps can be classified as "hot peel/cold peel". Thereafter, the transferred images were evaluated according to how well the image was transferred, including how well the polymer coating was limited to the printed areas. Table 8 summarizes the hot peel/cold peel experiments with the Canon 700 color copier images.

As noted above, in the second transfer step the release paper was allowed to cool before the release sheet backing was removed. Desirably, the release coating acts as a true release coating and nearly 100% of the toner is transferred to the fabric. Generally, this method is capable of giving the most desirable results, but the combination of release sheet and polymer coated sheet must be such that, in the first transfer step, the powdered polymer coating transfers only to the imaged areas of the release sheet. Also, the toner must not transfer to the powdered polymer sheet in this step. Several of the combinations of release sheet and powdered polymer sheet formulations did satisfy these requirements. Interestingly, these same combinations failed when the sheets were allowed to cool after the first pressing (cold peel in the first step). When cold peeling in the first transfer step, the toner transferred to the powdered polymer sheet. This is apparently due to the toner adhesion being stronger at higher temperatures.

Release sheets with a meltable conformable polymer layer under the release coat resulted in much better transfers than similar release sheets without the meltable conformable polymer layer under the release coat. This is because the meltable polymer layers allow conformability to the fabric surface. Generally, thinner, more conformable release coatings result in more durable transfers. For example, release sheet RS21 transfers washed better than release sheet RS23 transfers. Plain paper with a release coat did give nearly 100% transfer of the toner to the fabric in one experiment, but the image was glossy and not penetrated well into the fabric. The transfer could be improved somewhat by pressing it with a thin, silicone treated release paper.

Some of the hot peel/cold peel experiments resulted in small amounts of the powdered polymer coating transferring to the non-imaged areas of the release sheet in the first step. However, after the second transfer step, the background, or non-imaged areas of the fabric substrate did not appear significantly different than on those fabrics to which no polymer coating transferred in the non-printed areas.

TABLE 8

Hot Peel/Cold Peel Experiments With Canon 700 Color Copier Images

| Sheet1 (see Table 4) | Sheet2 (see Table 5) | Temp1 (deg F.) | Time(sec) | Results | Comments |
|---|---|---|---|---|---|
| RS18 | PS10 | 250 | 30 | good | 1 |
| RS18 | PS12 | 250 | 15 | good | 4, 5 |
| RS19 | PS10 | 250 | 30 | fair | 1, 2 |
| RS20 | PS10 | 250 | 30 | poor | 1 |

TABLE 8-continued

Hot Peel/Cold Peel Experiments With Canon 700 Color Copier Images

| Sheet1 (see Table 4) | Sheet2 (see Table 5) | Temp1 (deg F.) | Time(sec) | Results | Comments |
|---|---|---|---|---|---|
| RS21 | PS19 | 250 | 30 | good | 3, 4 |
| RS21 | PS20 | 250 | 30 | good | 3, 4 |
| RS21 | PS21 | 250 | 30 | good | 3, 4 |
| RS21 | PS16 | 250 | 30 | poor | 6 |
| RS21 | PS16 | 250 | 5 | good | 3, 7 |
| RS21 | PS22 | 250 | 30 | good | 4 |
| RS22 | PS10 | 250 | 30 | poor | 8 |
| RS23 | PS10 | 250 | 15 | good | 7 |
| RS23 | PS15 | 250 | 15 | good | 7 |
| RS23 | PS17 | 250 | 15 | good | 7 |
| RS23 | PS16 | 250 | 15 | good | 7 |
| RS27 | PS10 | 250 | 30 | good | 4 |
| RS27 | PS10 | 250 | 10 | good | 4 |
| RS27 | PS10 | 210 | 20 | good | 4 |

Table 8 Comments:

1. In some samples, transfer of toner to the polymer sheet occurred. Cold peel in the second step was good.
2. The transferred image was very glossy and not penetrated into the fabric well. Heat pressing with a thin silicone release sheet for 30 seconds at 350 degrees F. helped a little.
3. Some small spots of polymer transferred to the non-imaged areas of the release paper in the first step. Cold peel in the second step was good.
4. The transferred sample looked good even after 5 wash and dry cycles.
5. In the first transfer step, a very thin layer of polymer transferred to the non-imaged areas of the release paper.
6. Large portions of polymer transferred to the non-imaged areas in the first step.
7. There was some cracking of the images on the fabric after 5 wash and dry cycles.
8. The first transfer step worked well, but the paper was hard to remove from the fabric after the second transfer step (hard to peel cold).

A fourth set of experiments was performed, again using release sheets from Table 4 and powdered polymer coated sheets from Table 5. The release sheets were imaged using a Hewlett Packard 4600 color printer. The first transfer step was done by pressing the imaged release sheet against the polymer coated transfer sheet in a heat press for the indicated time and temperature. Thereafter, the transfer sheet back was removed while the sheets were still hot. The second transfer step was done by pressing the imaged release sheet with the attached powdered polymer coating against a 100% cotton Tee shirt material in a heat press for 30 seconds at 350 degrees F. The release sheet backing was removed after cooling of the release sheet material. As such, the transfer steps can be classified as “hot peel/cold peel”. Thereafter, the transferred images were evaluated according to how well the image was transferred, including how well the polymer coating was limited to the printed areas. Some of the hot peel/cold peel experiments resulted in successful transfers. However, the washability of the transferred images did not compare favorably with those imaged with the Canon 700 color copier. Using a hot peel transfer for the second transfer step resulted in insufficient transfer of the toner from the release sheet, even using designs which were successful with the Canon 700 color copier images. Table 9 summarizes the hot peel/cold peel experiments with Hewlett Packard 4600 color printer images.

TABLE 9

Hot Peel/Cold Peel Experiments With Hewlett Packard 4600 Laser Printer Images

| Sheet1 (see Table 4) | Sheet2 (see Table 5) | Temp1 (deg F.) | Time(sec) | Results | Comments |
|---|---|---|---|---|---|
| RS18 | PS12 | 250 | 30 | good | 1, 2, 3 |
| RS18 | PS10 | 250 | 30 | good | 1, 2, 4 |
| RS22 | PS10 | 250 | 30 | poor | 5 |
| RS23 | PS10 | 250 | 30 | good | 1 |

Table 9 Comments:

1. Both transfer steps worked well.
2. In some samples, some toner transferred to the polymer coated sheet.
3. There was extreme color loss after 5 wash and dry cycles.
4. The color faded about 30% after 5 wash and dry cycles.
5. The first step worked OK, but only about half of the toner transferred in the second step.

All wash tests were done using Tide detergent in a commercial washing machine (Unimat model 18 available from Unimat Corporation) at a medium soil setting. Drying was done in an heavy duty, large capacity, electric Kenmore drier.

It should be appreciated by those skilled in the art that various modifications or variations can be made in the invention without departing from the scope and spirit of the invention. It is intended that the invention include such modifications and variations as come within the scope of the appended claims and their equivalents.

What is claimed is:

1. A method of applying an image to a substrate, the method comprising positioning a release sheet material adjacent to a transfer layer to form a laminate, wherein the release sheet material defines a printed area forming an image and a non-printed area, wherein the transfer layer overlies a base sheet to form a transfer sheet material, and wherein the transfer layer comprises a film-forming binder and thermoplastic particles;

heating the laminate in both the printed area and non-printed area causing the transfer layer to fuse to the release sheet material in the printed area forming a fused portion of the transfer layer, wherein transfer coating remains unfused in the non-printed area of the release sheet material;

separating the release sheet material and the fused portion of the transfer layer from the laminate to form an intermediary transfer material, wherein the fused portion of the transfer layer overlays the image on the intermediary transfer layer and the unfused, non-printed area of intermediary transfer material remain on the transfer sheet material;

positioning the intermediary transfer material so that the remaining fused portion of the transfer layer is adjacent to the substrate and the image is between the transfer layer and the release sheet material;

heating the intermediary transfer material to transfer the transfer layer and the image to the substrate; and removing the release sheet material from the substrate so that the image is exposed on the substrate, wherein the image overlies the transfer layer and the transfer layer overlies the substrate.

2. A method as in claim 1, wherein the substrate includes a fabric.

3. A method as in claim 1, wherein the release sheet material comprises a release layer and a base layer, and wherein the image is formed on a surface of the release layer.

4. A method as in claim 3, wherein the release sheet material further comprises a conformable layer positioned between the release layer and the base layer of the release sheet material.

5. A method as in claim 3, wherein the release layer is coated on the base layer of the release sheet material.

6. A method as in claim 3, wherein the release layer comprises a silicone polymer.

7. A method as in claim 3, wherein the release layer comprises an acrylic polymer or co-polymer.

8. A method as in claim 7, wherein the release layer comprises an acrylic copolymer of ethylene acrylic acid.

9. A method as in claim 3, wherein the release layer comprises a crosslinked polymer.

10. A method as in claim 9, wherein the crosslinked polymer is formed from a crosslinkable polymeric binder and a crosslinking agent.

11. A method as in claim 3, wherein the release layer comprises a particulate material.

12. A method as in claim 11, wherein the particulate material comprises clay particles.

13. A method as in claim 3, wherein the release layer comprises polyethylene oxide.

14. A method as in claim 3, wherein the release layer comprises a pH control agent.

15. A method as in claim 3, wherein the release layer is substantially non-porous to inhibit penetration of the image into an underlying layer.

16. A method as in claim 1, wherein the transfer sheet material further comprises a release layer positioned between the transfer layer and the base layer.

17. A method as in claim 1, wherein the transfer layer comprises greater than 10% by weight of the film-forming binder and less than 90% by weight of the thermoplastic particles.

18. A method as in claim 1, wherein the film-forming binder melts in the range of from 65° C. to 180° C.

19. A method as in claim 1, wherein the film-forming binder melts in the range of from 80° C. to 120° C.

20. A method as in claim 1, wherein the thermoplastic particles melt in the range of from 65° C. to 180° C.

21. A method as in claim 1, wherein the thermoplastic particles melt in the range of from 80° C. to 120° C.

22. A method as in claim 1, wherein the film-forming binder comprises an ethylene-acrylic acid copolymer.

23. A method as in claim 1, wherein the thermoplastic particles comprise a polyamide.

24. A method as in claim 1, wherein the thermoplastic particles comprise a polyester.

25. A method as in claim 1, wherein the thermoplastic particles comprise an ethylene-vinyl acetate copolymer.

26. A method as in claim 1, wherein the thermoplastic particles have a diameter of from 2 to 50 micrometers.

27. A method as in claim 1, wherein the transfer layer further comprises an opacifier.

28. A method as in claim 1 further comprising printing the image onto a surface of the release sheet material.

29. A method as in claim 1, wherein the step of transferring the transfer layer and the image to the substrate is performed by applying heat and pressure.

* * * * *